(12) United States Patent
Tani et al.

(10) Patent No.: US 9,253,553 B2
(45) Date of Patent: Feb. 2, 2016

(54) TRANSMISSION APPARATUS AND SWITCHING METHOD

(71) Applicant: FUJITSU LIMITED, Kawasaki-shi, Kanagawa (JP)

(72) Inventors: Shigeo Tani, Kashihara (JP); Takashi Umegaki, Osaka (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 13/714,891

(22) Filed: Dec. 14, 2012

(65) Prior Publication Data
US 2013/0195453 A1 Aug. 1, 2013

(30) Foreign Application Priority Data

Feb. 1, 2012 (JP) ................. 2012-019773

(51) Int. Cl.
H04Q 11/00 (2006.01)
H04J 3/08 (2006.01)
H04J 3/16 (2006.01)
(52) U.S. Cl.
CPC ............ *H04Q 11/0003* (2013.01); *H04J 3/085* (2013.01); *H04J 3/1652* (2013.01); *H04J 2203/006* (2013.01); *H04J 2203/0096* (2013.01)
(58) Field of Classification Search
USPC .............................. 398/50; 370/380, 393, 404
See application file for complete search history.

(56) References Cited

U.S. PATENT DOCUMENTS 7,042,836 B2 * 5/2006 Isonuma ................. H04J 3/085
370/222
2001/0046207 A1 11/2001 Isonuma et al.
2002/0181479 A1 * 12/2002 Okuno .................... H04J 3/085
370/404
2004/0151172 A1 * 8/2004 Notani .................... H04J 3/085
370/380
2004/0196847 A1 * 10/2004 Kuwabara ............. H04J 3/0623
370/393

FOREIGN PATENT DOCUMENTS

JP 2001-339416 12/2001
JP 2002-359627 12/2002
JP 2004-236205 8/2004

OTHER PUBLICATIONS

Japanese Patent Office Action dated May 26, 2015 in corresponding Japanese Patent Application No. 2012-019773.

* cited by examiner

*Primary Examiner* — David Payne
*Assistant Examiner* — Omar S Ismail
(74) *Attorney, Agent, or Firm* — Staas & Halsey LLP

(57) ABSTRACT

A transmission apparatus includes: an assigning unit to assign a number to a group of concatenation information of leading and dependent data which are multicast or broadcast; a retrieval unit to retrieve the concatenation information of the leading data corresponding to the dependent data, the leading and dependent data having the same number; a regeneration unit to regenerate concatenation information of the dependent data in accordance with the concatenation information of the leading data; a storage unit to store switch information of the leading data, the switch information representing a switch which switches output destinations of the leading and dependent data; an information retrieval unit to refer to the storage unit in accordance with leading data information included in the concatenation information of the dependent data so as to retrieve switch information of the dependent data; and a switching unit to switch the output destination of the dependent data.

7 Claims, 29 Drawing Sheets

FIG. 20

|  | E-WK | E-PT | W-WK | W-PT |
|---|---|---|---|---|
| APPLICATION A | X11 | X21 | X31 | X41 |
| APPLICATION B | X12 | X22 | X32 | X42 |
| ⋮ | ⋮ | ⋮ | ⋮ | ⋮ |

TRANSMISSION APPARATUS AND SWITCHING METHOD

CROSS-REFERENCE TO RELATED APPLICATION

This application is based upon and claims the benefit of priority of the prior Japanese Patent Application No. 2012-019773, filed on Feb. 1, 2012, the entire contents of which are incorporated herein by reference.

FIELD

The embodiments discussed herein are related to a transmission apparatus which transmits an optical signal and a switching method.

BACKGROUND

As optical techniques have been developed, schema of optical paths suitable for DWDM (Dense Wavelength Division Multiplex) communication and an OTN (Optical Transport Network) employing a code error correction technique and the like have been standardized.

In the OTN, while a main stream of a communication core network is changed from audio to data, Ethernet (registered trademark) has been widely used, and therefore, common standards are also changed to cope with Ethernet. Furthermore, transmission capacity is also increased to 10 G, 40 G, and 100 G which is commonly standardized.

Note that, in general, a protection method which employs an LCAS (Link Capacity Adjustment Scheme), which effectively utilizes a band of a ring network system when a network failure has not occurred, and which conducts a protection process when a failure has occurred so that all data is supplied to a transmission destination and a ring apparatus which employs the protection method have been developed (refer to Japanese Laid-open Patent Publication No. 2002-359627, for example).

SUMMARY

According to an aspect of the invention, a transmission apparatus includes: a cross-connect unit configured to multicast or broadcast concatenation information; an assigning unit configured to assign a group number to a group of concatenation information of leading data and concatenation information of dependent data which are multicast or broadcast by the cross-connect unit; a retrieval unit configured to retrieve the concatenation information of the leading data corresponding to the dependent data, the leading data and the dependent data having the same group number assigned by the assigning unit; a regeneration unit configured to regenerate concatenation information of the dependent data in accordance with the concatenation information of the leading data retrieved by the retrieval unit; a storage unit configured to store switch information of the leading data, the switch information representing a switch which switches output destinations of the leading data and the dependent data; an information retrieval unit configured to refer to the storage unit in accordance with leading data information included in the concatenation information of the dependent data regenerated by the regeneration unit so as to retrieve switch information of the dependent data corresponding to the concatenation information regenerated by the regeneration unit; and a switching unit configured to switch the output destination of the dependent data in accordance with the switch information retrieved by the information retrieval unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a diagram illustrating conversion of concatenation information relative to applications;

DESCRIPTION OF EMBODIMENTS

In the OTN, data groups (concatenation groups) may be freely configured. Therefore, there arises a problem in that, when data is transmitted in a multicast manner using a plurality of tributary slots (ts), pairing of leading data and dependent data which is dependent on the leading data may be dissolved after switching.

The present technique has been made in view of this problem and the present technique provides a transmission apparatus and a switching method which are capable of restoring a pair of leading data and dependent data after switching.

Embodiments will be described hereinafter in detail with reference to the accompanying drawings.

First Embodiment

Figure 1:
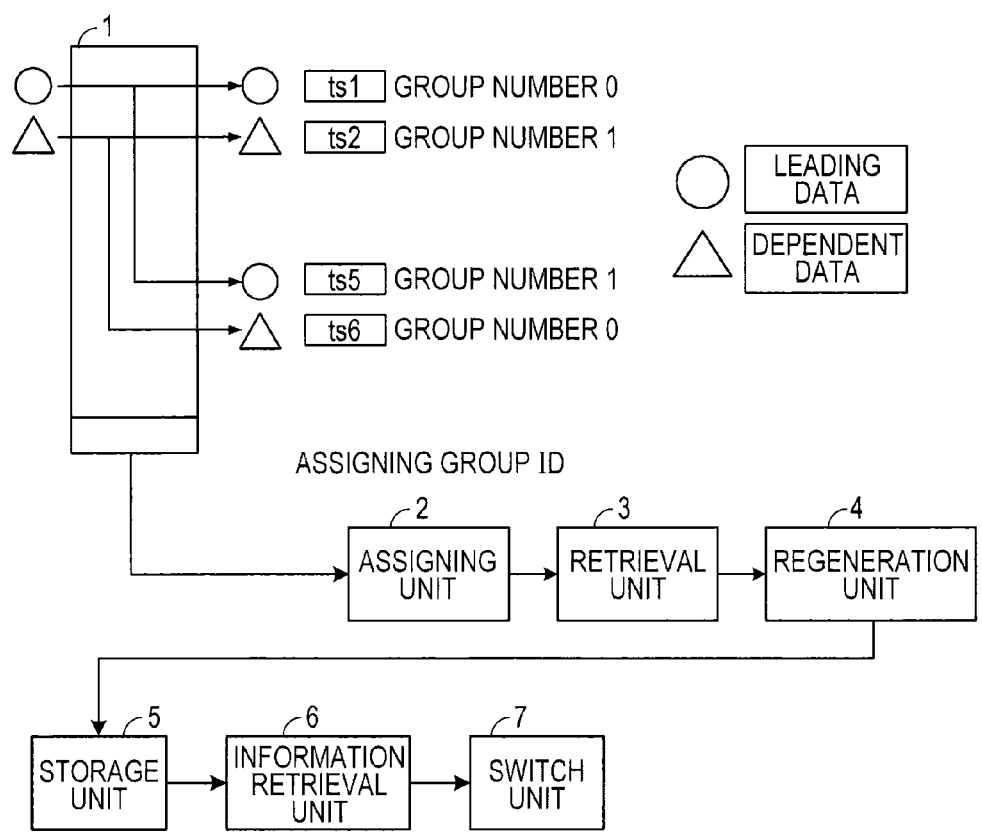
FIG. 1 is a diagram illustrating a transmission apparatus according to a first embodiment.

FIG. 1 is a diagram illustrating a transmission apparatus according to a first embodiment. As illustrated in FIG. 1, the transmission apparatus includes a cross-connect (XC) unit 1, an assigning unit 2, a retrieval unit 3, a regeneration unit 4, a storage unit 5, an information retrieval unit 6, and a switch unit 7.

The XC unit 1 transmits concatenation information in a multicast manner or a broadcast manner. The XC unit 1 recognizes the correspondence relationship between concatenation information of a leading tributary slot (ts) and concatenation information of a dependent ts which are to be transmitted in the multicast manner or the broadcast manner.

The assigning unit 2 assigns a group number to a group of the concatenation information of the leading data and the concatenation information of the dependent data which are multicast or broadcast by the XC unit 1. As illustrated in FIG. 1, for example, the assigning unit 2 assigns a group number 0 to concatenation information of a leading ts1 and concatenation information of a dependent ts6 which is dependent on the leading ts1. Furthermore, the assigning unit 2 assigns a group number 1 to concatenation information of a leading ts5 and concatenation information of a dependent ts2 which is dependent on the leading ts5.

The retrieval unit 3 retrieves concatenation information of leading data corresponding to dependent data which has a group number assigned by the assigning unit 2 which is the same as that of the leading data. For example, when a leading ts corresponding to the dependent ts6 is to be obtained, the retrieval unit 3 retrieves a tributary slot having the group number 0 so as to retrieve the concatenation information of the leading ts1 corresponding to the dependent ts6.

The regeneration unit 4 regenerates concatenation information of the dependent data in accordance with the concatenation information of the leading data retrieved by the retrieval unit 3. For example, the regeneration unit 4 regenerates the concatenation information of the dependent ts6 in accordance with the concatenation information of the leading ts1. By regenerating concatenation information, the concatenation information of the dependent ts6 includes information on a new output destination of the leading ts1 after cross-connect is performed, for example.

The storage unit 5 stores switch information regarding the leading data of a switch which switches an output destination of the leading data and the dependent data.

The information retrieval unit 6 retrieves switch information of the dependent data corresponding to the concatenation information regenerated by the regeneration unit 4 with reference to the storage unit 5 in accordance with leading data information included in the concatenation information of the dependent data regenerated by the regeneration unit 4. The information retrieval unit 6 retrieves switch information of the leading ts1 corresponding to the dependent ts6 with reference to the storage unit 5 in accordance with leading data information of the leading ts1 included in the dependent ts6, for example.

The switch unit 7 operates a switch of the dependent data in accordance with the switch information retrieved by the information retrieval unit 6. The switch unit 7 switches the output destination of the dependent ts6 in accordance with the switch information of the leading ts1 retrieved by the information retrieval unit 6, for example. Specifically, the switch unit 7 operates the switch of the dependent ts6 using the switch information of the leading ts1 corresponding to the dependent ts6 so as to restore a pair of the leading ts1 and the dependent ts6 after the switching.

As described above, the transmission apparatus assigns a group number to a group of concatenation information which is transmitted in a multicast manner or a broadcast manner and retrieves concatenation information of leading data corresponding to dependent data which belongs to the same group number. Furthermore, the transmission apparatus regenerates the concatenation information of the dependent data in accordance with the retrieved concatenation information of the leading data. Moreover, the transmission apparatus retrieves the switch information of the leading data corresponding to the dependent data corresponding to the concatenation information regenerated by the regeneration unit 4 with reference to the storage unit 5 in accordance with the leading data information included in the concatenation information of the dependent data. Thereafter, the transmission apparatus switches the output destination of the dependent data in accordance with the retrieved switch information. By this, the transmission apparatus restores pairing between the leading data and the dependent data after the switching. Furthermore, since the pairing between the leading data and the dependent data is restored, data mapping can be appropriately performed after the switching.

Second Embodiment

Next, a second embodiment will be described in detail with reference to the accompanying drawings. Before the description of the second embodiment, a problem which arises in the OTN in which concatenation groups can be freely configured will be described. First, a problem in a 2F-BLSR (2Fiber-Bidirectional Line Switched Ring) will be described.

Figure 2:
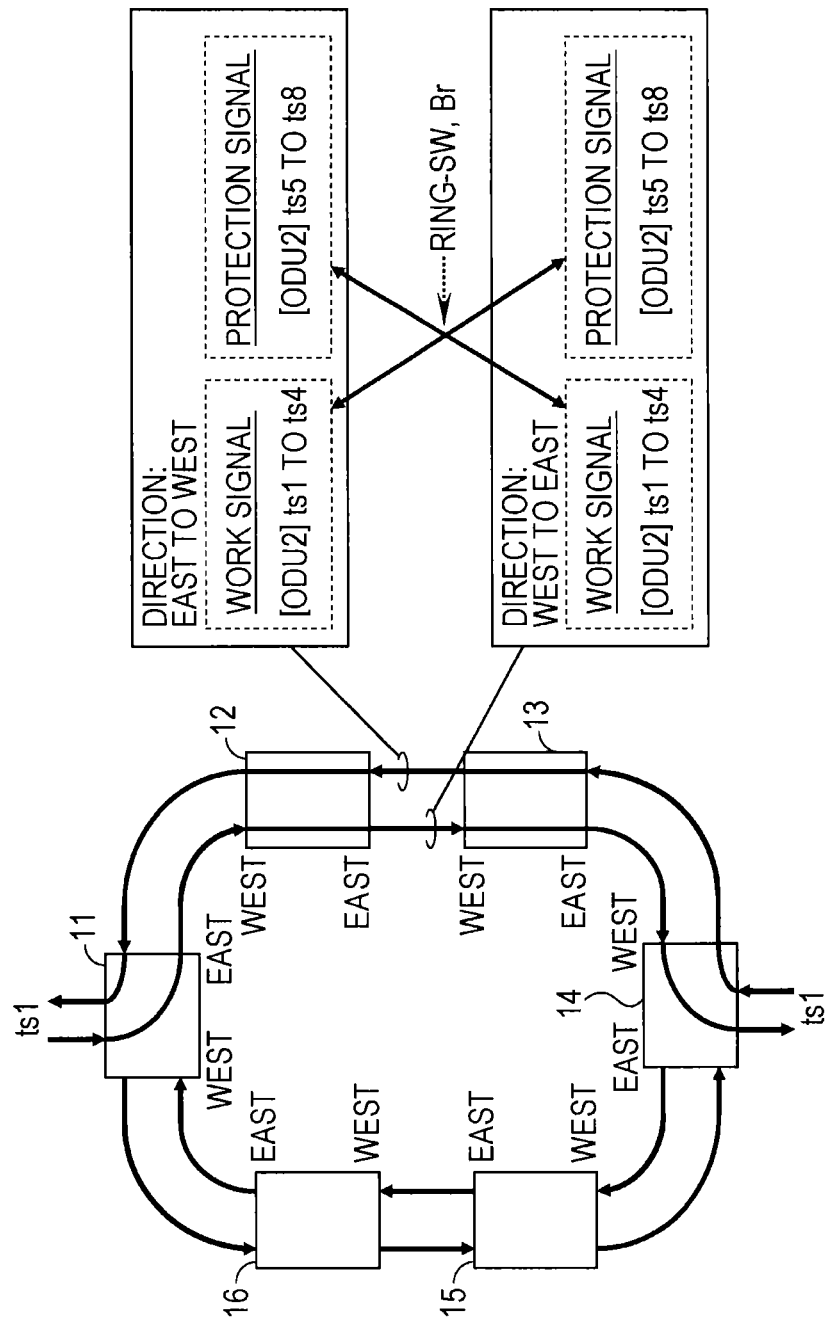
FIG. 2 is a diagram illustrating a normal state of a 2F-BLSR.

FIG. 2 is a diagram illustrating a normal state of the 2F-BLSR. As illustrated in FIG. 2, transmission apparatuses 11 to 16 form a ring network of the OTN. The OTN illustrated in FIG. 2 performs ring switching in accordance with the 2F-BLSR when a failure occurs. FIG. 2 illustrates a state in which a failure has not occurred (normal state), and the transmission apparatuses 11 and 14 transmit signals through the transmission apparatuses 12 and 13, for example.

The transmission apparatuses 11 to 16 use half of line capacity for work signals and the other half for protection signals, for example. Assuming that the transmission apparatuses 12 and 13 are connected by ODU (Optical channel Data Unit) 2, as illustrated in FIG. 2, ts1 to ts4 are used for work signals and ts5 to ts8 are used for protection signals.

Figure 3:
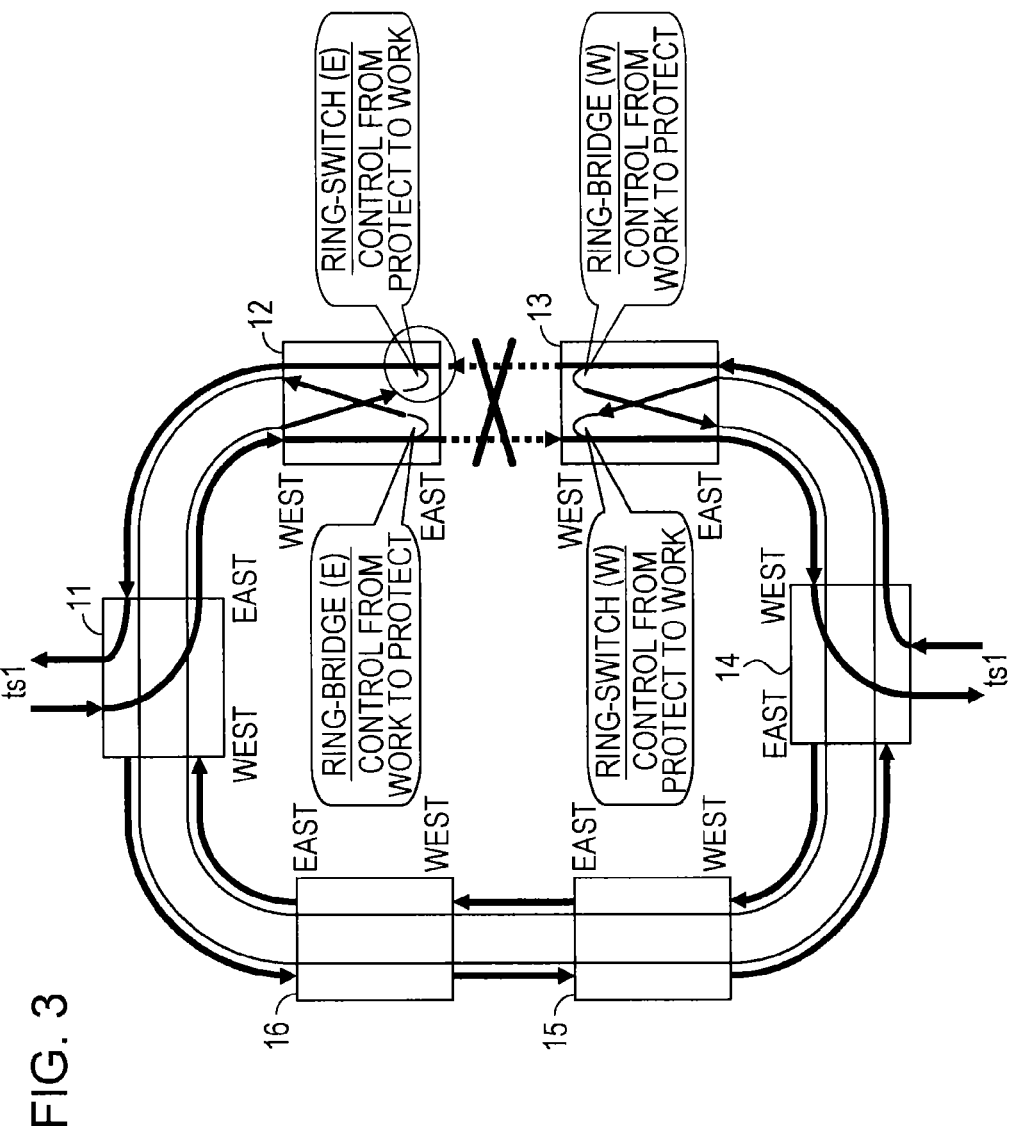
FIG. 3 is a diagram illustrating a failure state of the 2F-BLSR.

FIG. 3 is a diagram illustrating a failure state of the 2F-BLSR. In FIG. 3, components the same as those illustrated in FIG. 2 are denoted by reference numerals the same as those used in FIG. 2, and descriptions thereof are omitted. In FIG. 3, a failure has occurred between the transmission apparatuses 12 and 13. In this case, in the transmission apparatus 12, a ring-bridge (E) and a ring-switch (E) on an east side are turned on. Furthermore, in the transmission apparatus 13, a ring-bridge (W) and a ring-switch (W) on a west side are turned on.

Focusing attention on signal transmission from the east side to the west side, signals output from ts1 to ts4 on the west side of the transmission apparatus 13 are supplied through ts5 to ts8 on the east side and further supplied through the transmission apparatuses 14, 15, 16, and 11 to the transmission apparatus 12 by the switch and bridge control described above. Signals output from ts5 to ts8 on the east side of the transmission apparatus 12 are supplied through ts1 to ts4 on the west side to the transmission apparatus 11. By this, signal transmission from the east side to the west side is relieved.

Focusing attention on signal transmission from the west side to the east side, signals output from ts1 to ts4 on the east side of the transmission apparatus 12 are supplied through ts5 to ts8 on the west side and further supplied through the transmission apparatuses 11, 16, 15, and 14 to the transmission apparatus 13 by the switch and bridge control described above. Signals output from ts5 to ts8 on the west side of the transmission apparatus 13 are supplied through ts1 to ts4 on the east side to the transmission apparatus 14. By this, signal transmission from the west side to the east side is relieved.

Figure 4:
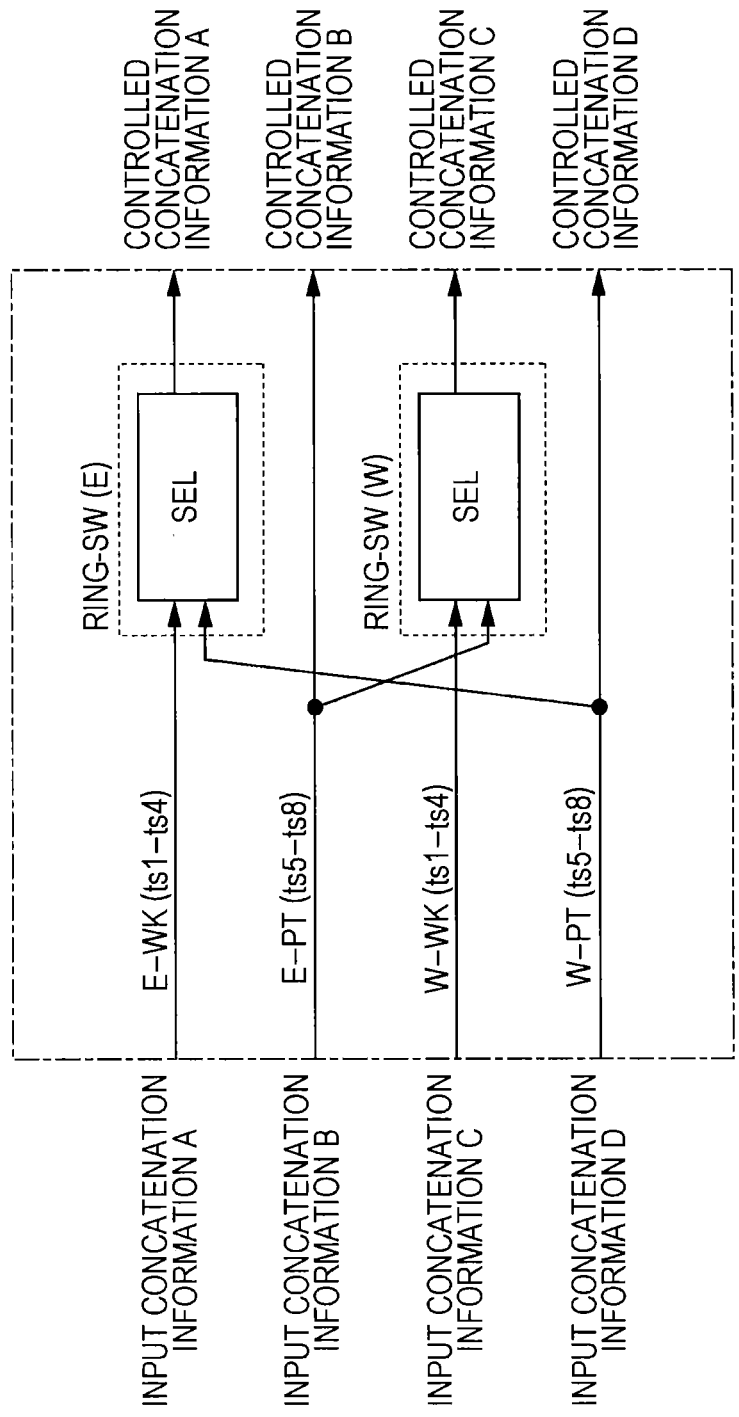
FIG. 4 is a diagram illustrating a flow of concatenation information in a normal state.

FIG. 4 is a diagram illustrating a flow of concatenation information in a normal state. In FIG. 4, ring switches in a transmission apparatus are illustrated. As illustrated in FIG. 4, in the normal state, a ring-switch (E) on an east side allows input concatenation information (input concatenation code) A to pass through so as to output the input concatenation information A. The ring-switch (W) on a west side allows input concatenation information C to pass through so as to output the input concatenation information C.

Figure 5:
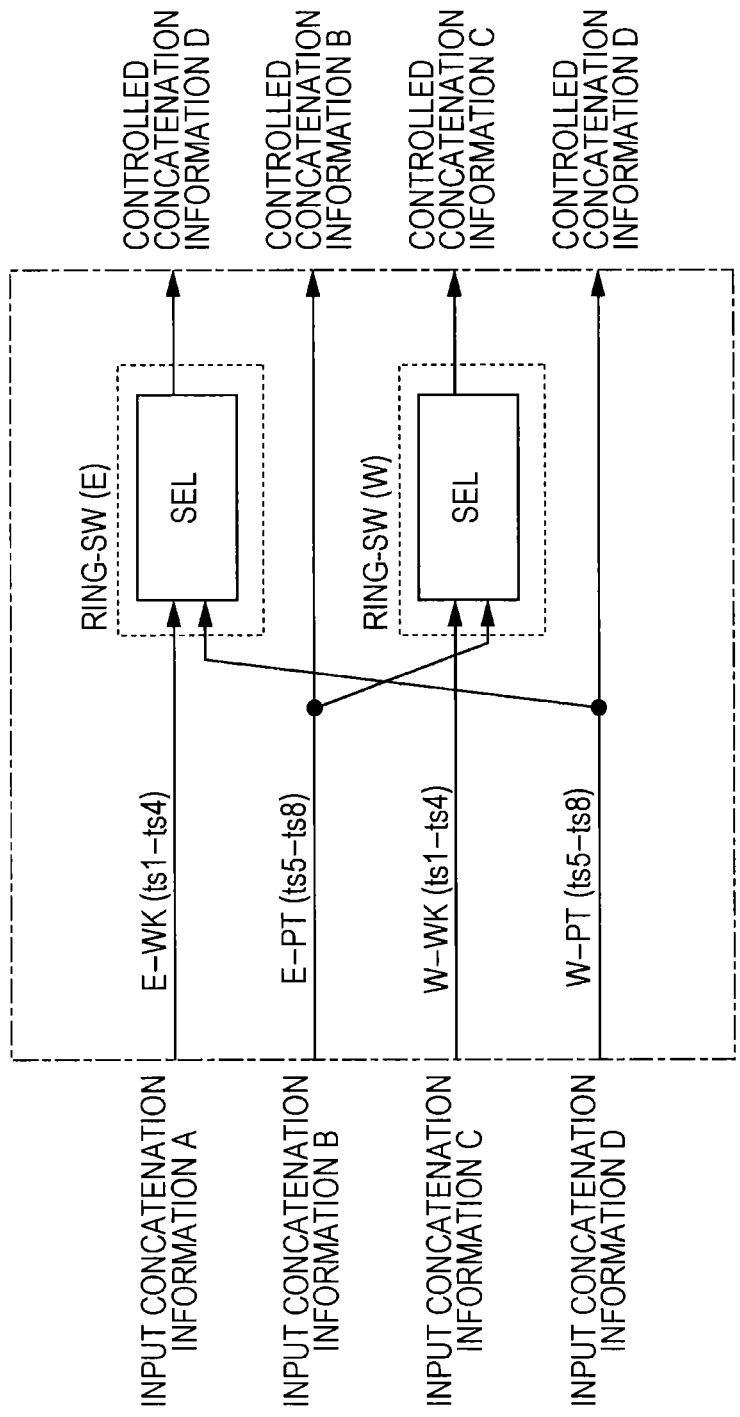
FIG. 5 is a diagram illustrating flows of concatenation information in a failure state.

FIG. 5 is a diagram illustrating flows of concatenation information in a failure state. In the example of FIG. 5, the ring-switch (E) selects and outputs the input concatenation information D in the event of failure. The ring-switch (W) allows the input concatenation information C to pass through so as to output the input concatenation information C in the event of failure. Therefore, the concatenation information D output from the ring-switch on an east work side and the concatenation information D output from the ring-switch on a west protection side of the transmission apparatus have the same code. Accordingly, when a dependent ts is controlled in accordance with a leading ts on a downstream side of the transmission apparatus, the dependent ts does not correspond to only one leading ts, and therefore, the dependent ts may be subjected to improper control.

Figure 6A:
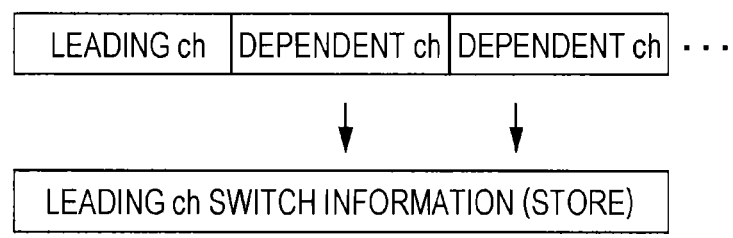
FIG. 6A is a diagram illustrating matching of switch information in an SONET.
Figure 6B:
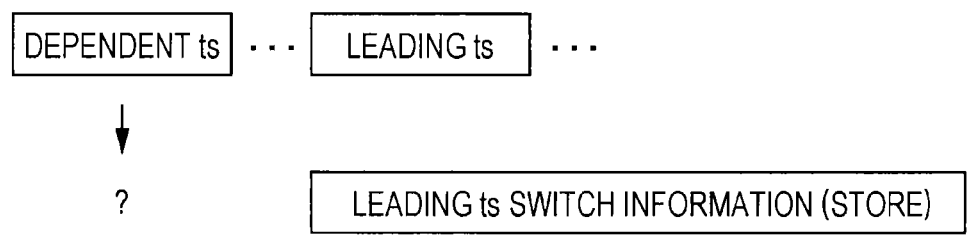
FIG. 6B is a diagram illustrating matching of switch information in an OTN.

Next, a problem which arises in matching of switch states will be described. FIGS. 6A and 6B are diagrams illustrating matching of switch states in an SONET (Synchronous Optical Network) and the OTN. FIG. 6A is a diagram illustrating matching of switch states in the SONET. FIG. 6B is a diagram illustrating matching of switch states in the OTN. Examples of switches include a PSW (Pass SWitch), a DTP (Dual Transmit on Protection)-SW, and an SS (Service Selector).

As illustrated in FIG. 6A, in the SONET, a leading channel is followed by a dependent channel and another dependent channel, and the correspondence relationship between the dependent channels and the leading channel is recognized. Therefore, when switch information of the leading channel is stored in a memory, the dependent channel can use the stored switch information of the leading channel. By this, the same switch state is used in the channels in the concatenation information.

On the other hand, as illustrated in FIG. 6B, in the OTN, since the positional relationship between a dependent ts and a leading ts included in a concatenation group is not fixed, the same switch state is not used in the tributary slots in the concatenation information.

Figure 7:
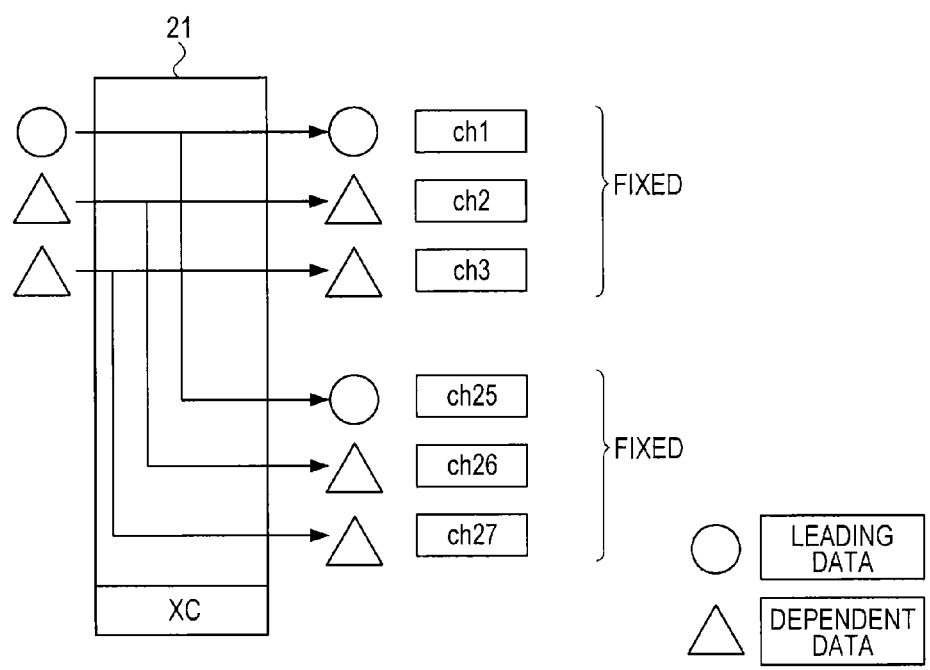
FIG. 7 is a diagram illustrating multicast in the SONET.

Next, a problem which arises in multicast transmission will be described. FIG. 7 is a diagram illustrating multicast in the SONET. In FIG. 7, a cross-connect 21 included in the transmission apparatus is illustrated. In FIG. 7, the cross-connect 21 multicasts input data.

In the SONET, as also illustrated in FIG. 6, a concatenation group is fixed. Accordingly, in the SONET, a concatenation group obtained after cross-connect is clearly recognized. Specifically, in the SONET, even when output channels are arbitrarily set in the cross-connect, if a concatenation type (STS-3c, STS-12c, STS-48c, STS-192c, or STS-768c) is obtained, a concatenation group corresponding of the channels is recognized. For example, in FIG. 7, it is recognized that channels 2 and 3 are dependent on a channel 1. Furthermore, it is recognized that channels 26 and 27 are dependent on a channel 25.

Figure 8:
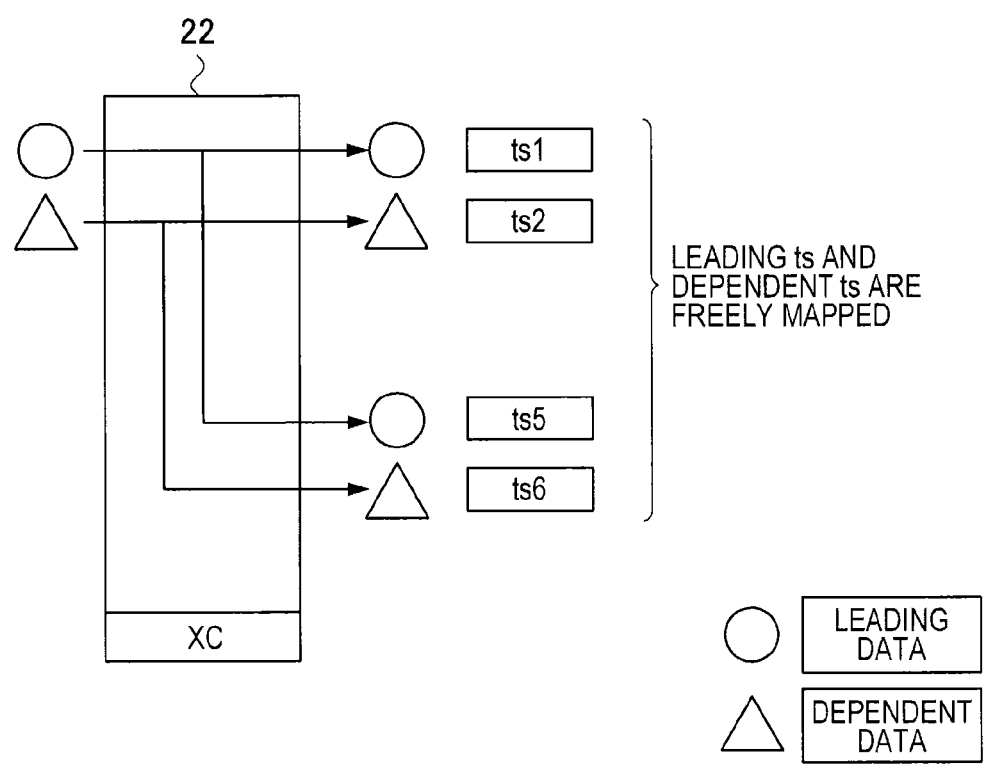
FIG. 8 is a diagram illustrating multicast in the OTN.

FIG. 8 is a diagram illustrating multicast in the OTN. In an OTN standard, the relationship between a leading ts and a dependent ts can be flexibly set. Therefore, in the OTN, unlike the cross-connect in the SONET illustrated in FIG. 7, the relationship between the leading ts and the dependent ts is not recognized on an output side. For example, in FIG. 8, it is not possible to determine whether a leading ts of ts2 is ts1 or ts5.

Figure 9:
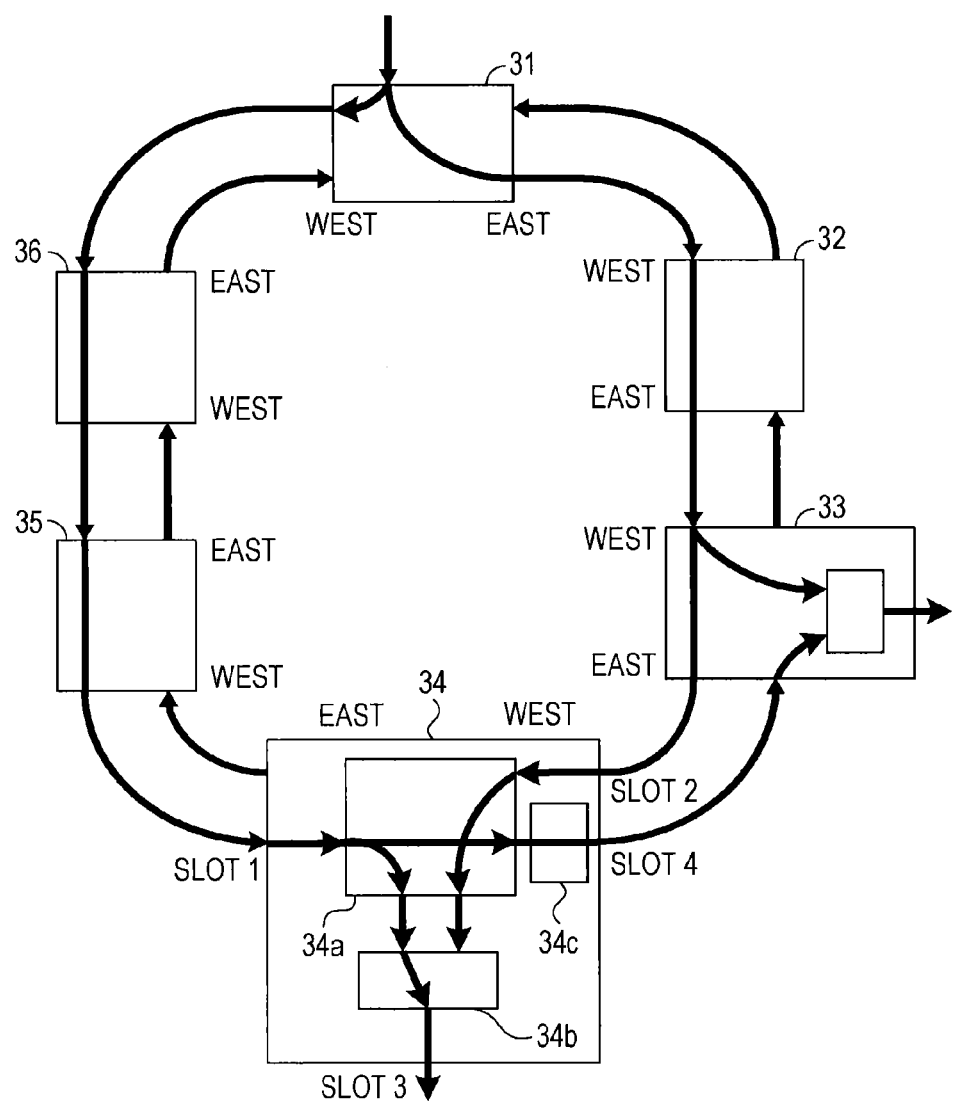
FIG. 9 is a diagram illustrating a normal state of a UPSR.

A problem which arises in a UPSR (Unidirectional Path Switched Ring) will be described. FIG. 9 is a diagram illustrating a normal state of the UPSR. As illustrated in FIG. 9, transmission apparatuses 31 to 36 form a ring network of the OTN. The OTN illustrated in FIG. 9 performs ring switching in accordance with the UPSR in the event of failure. In FIG. 9, a failure has not occurred (normal state). The transmission apparatus 34 includes a cross-connect 34a and path switches 34b and 34c.

In the UPSR in the normal state, as illustrated in FIG. 9, the transmission apparatus 31 on a transmission side transmits the same signals in east and west directions, for example. Then the transmission apparatuses 33 and 34 on a reception side select one of the signals which has better line quality (that is, perform path-switching) and receive the signal so as to perform signal relief.

In the example of FIG. 9, the signals supplied from the transmission apparatus 31 are received by the cross-connect 34a of the transmission apparatus 34 through slots 1 and 2. The cross-connect 34a outputs the signals input through the slots 1 and 2 to the path switch 34b which drops the signal input from the slot 1. Specifically, the transmission apparatus 34 receives the signals supplied from the transmission apparatus 31 from the east and west sides and drops the signal supplied from the east side.

Furthermore, the cross-connect 34a outputs the signal input through the slot 1 to the path switch 34c which outputs the signal input from the slot 1 to a slot 4. Specifically, the transmission apparatus 34 allows the signal supplied from the east side to pass through to the west side. The signal which has passed through is transmitted to the transmission apparatus 33 and dropped. Note that a slot is referred to as an "interface card" where appropriate hereinafter.

Figure 10:
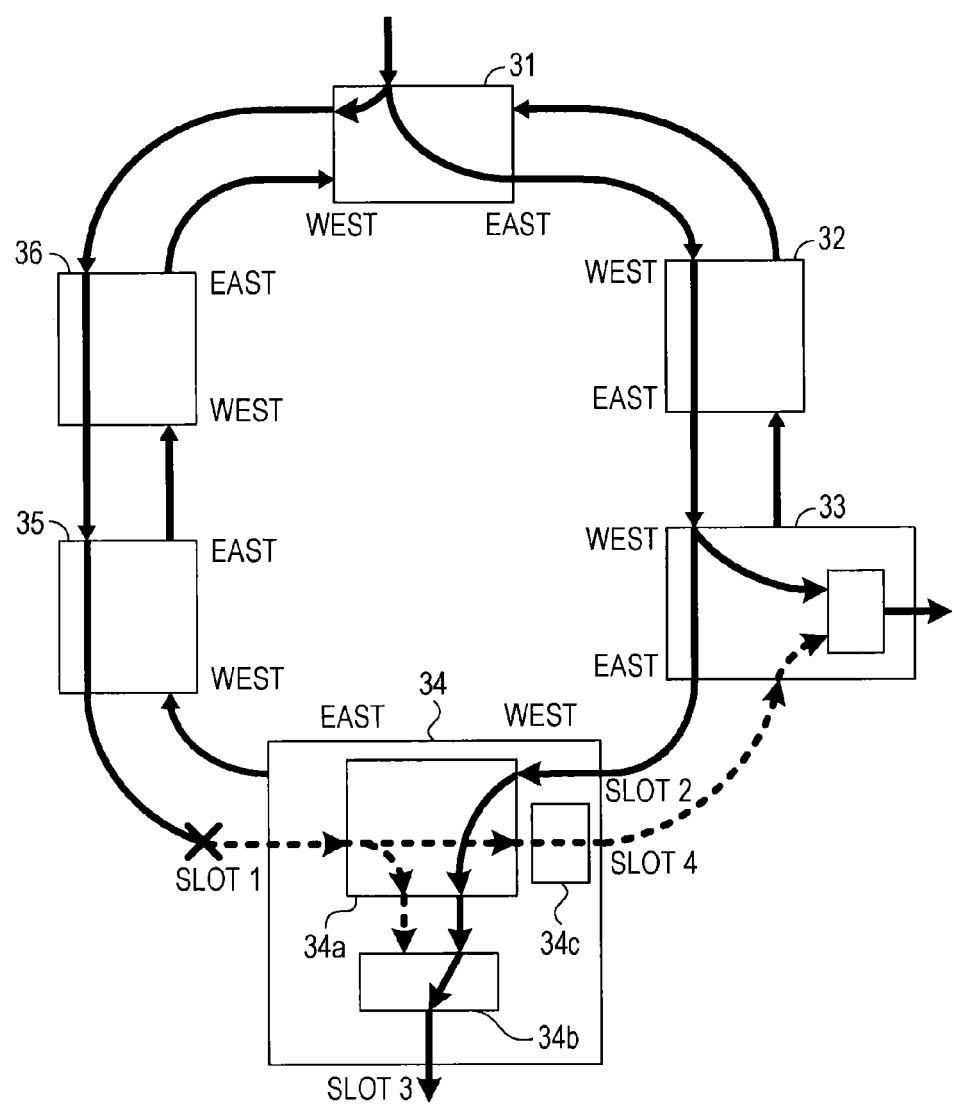
FIG. 10 is a diagram illustrating a failure state of the UPSR.

FIG. 10 is a diagram illustrating a failure state of the UPSR. In FIG. 10, components the same as those illustrated in FIG. 9 are denoted by reference numerals the same as those used in FIG. 9, and descriptions thereof are omitted. In FIG. 10, a failure has occurred in a west to east direction between the transmission apparatuses 34 and 35. Therefore, a signal supplied to the transmission apparatus 34 from the east side is blocked. The path switch 34b included in the transmission apparatus 34 drops a signal supplied from the slot 2 to the slot 3. That is, the transmission apparatus 34 drops a signal supplied from the west side so as to perform signal relief.

Figure 11:
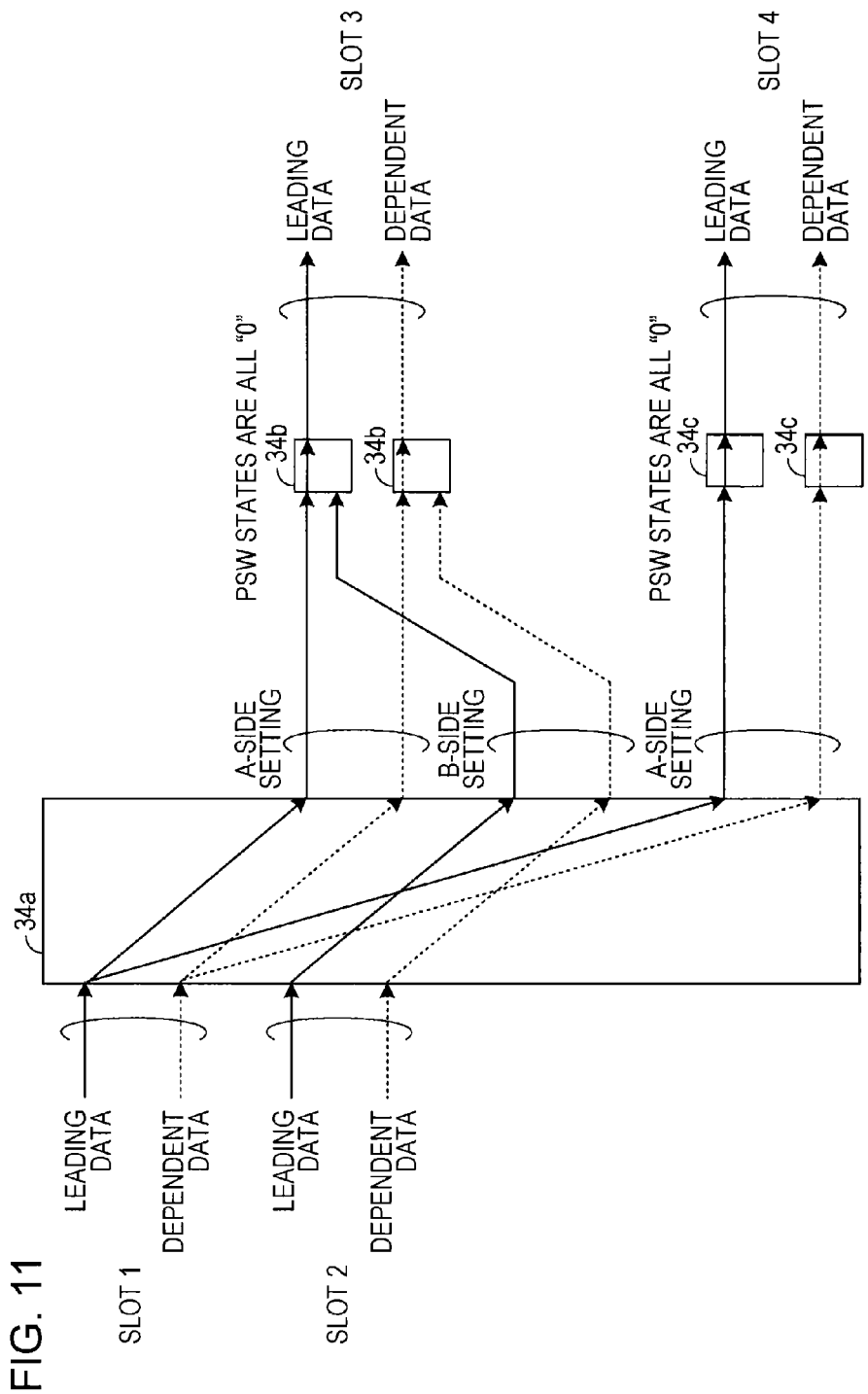
FIG. 11 is a diagram illustrating a cross-connect operation and a path-switch operation in a normal state.

FIG. 11 is a diagram illustrating a cross-connect operation and a path-switch operation in a normal state. In FIG. 11, the cross-connect 34*a* and the path switches (PSWs) 34*b* and 34*c* included in the transmission apparatus 34 are illustrated. It is assumed that signals to be transmitted correspond to a data group (concatenation group) of a plurality of tributary slots of ODU1 or ODU2. Note that a leading ts of a concatenation group is referred to as "leading data" where appropriate. Furthermore, a dependent ts of a concatenation group is referred to as "dependent data" where appropriate.

The cross-connect 34*a* has an A side and a B side which correspond to the east side and the west side, respectively, as a setting. The cross-connect 34*a* sets the slot 1 to the A side (east side) and the slot 2 to the B side (west side) relative to the slot 3 to which leading data and dependent data are dropped. The path switch 34*b* selects the slot 1 in the normal state (a path switch state is "0") and drops data to the slot 3. Specifically, the path switch 34*b* drops leading data and dependent data supplied from the east side to the slot 3.

The cross-connect 34*a* performs a setting such that the slot 4 corresponds to the slot 1. In FIG. 11, the slot 4 does not drop signals, and therefore, the path switch 34*c* does not perform switch control (a path switch state is "0"). Note that the path switch 34*c* is implemented on an output side relative to the cross-connect 34*a* as hardware.

Figure 12:
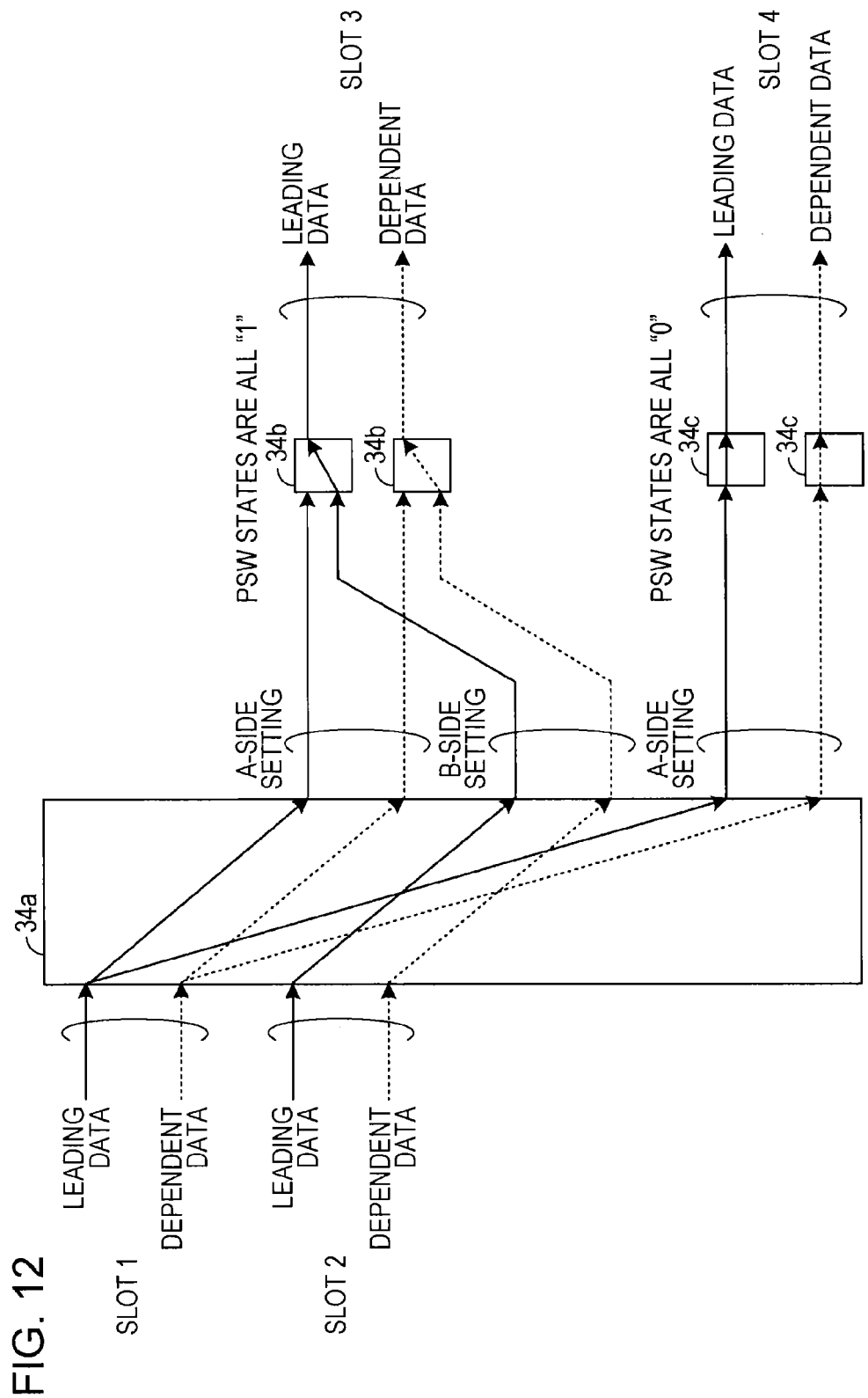
FIG. 12 is a diagram illustrating a cross-connect operation and a path-switch operation in a failure state (part 1)

FIG. 12 is a diagram illustrating a cross-connect operation and a path-switch operation in a failure state (part 1). In FIG. 12, components the same as those illustrated in FIG. 11 are denoted by reference numerals the same as those used in FIG. 11. In FIG. 12, an operation performed when a failure occurs between the transmission apparatuses 34 and 35 as illustrated in FIG. 10 is illustrated.

When a failure occurs in the position illustrated in FIG. 10, an alarm is generated in a signal supplied from the slot 1. Therefore, the path switch 34*b* selects leading data supplied from the slot 2 which has better line quality (a path switch state is "1") and outputs the leading data to the slot 3. Furthermore, the path switch 34*b* selects dependent data supplied from a direction the same as the selected leading data (a path switch state is "1") and outputs the dependent data to the slot 3. In this way, signal relief is performed on a signal supplied from the transmission apparatus 31.

Figure 13:
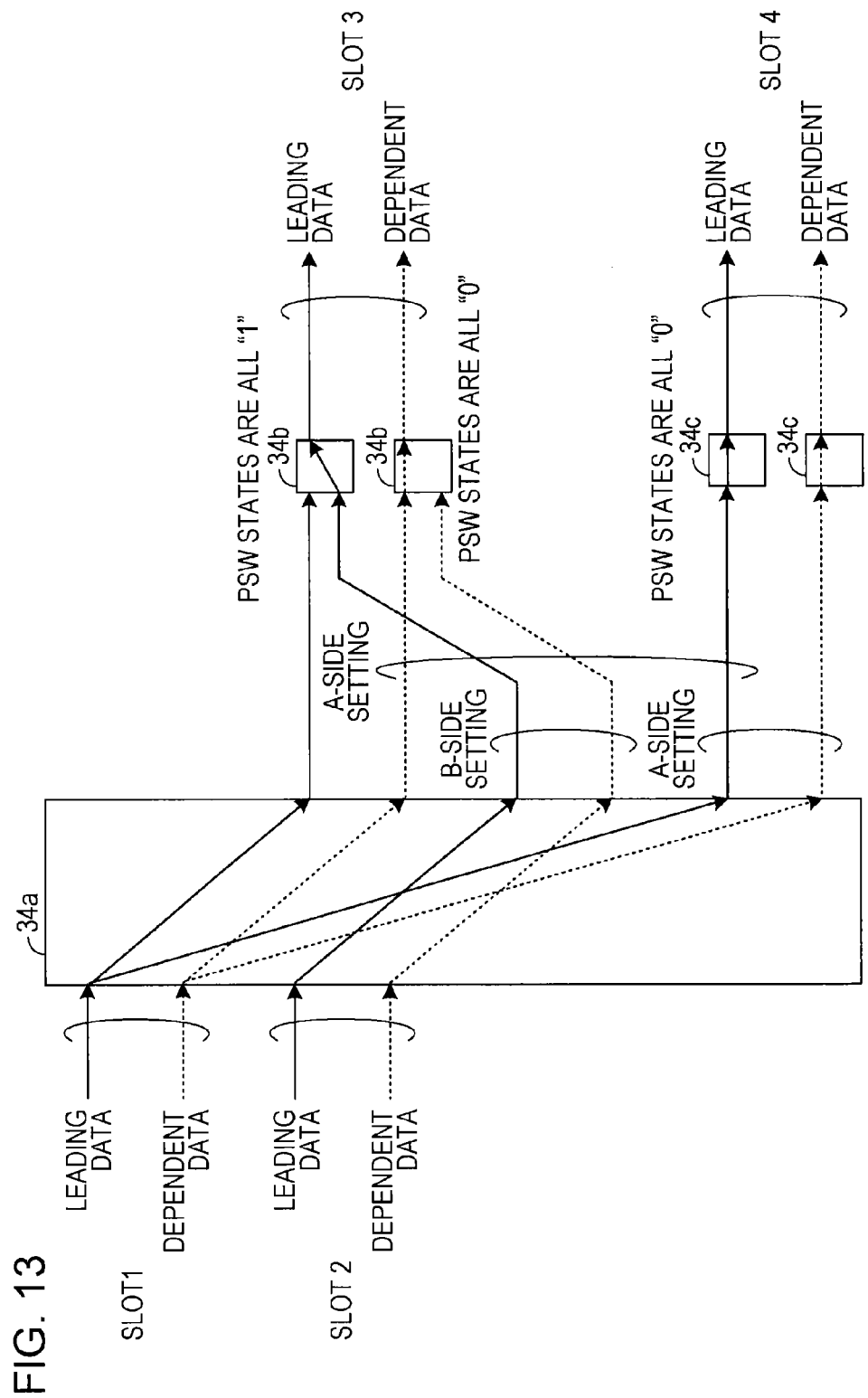
FIG. 13 is a diagram illustrating the cross-connect operation and the path-switch operation in the failure state (part 2)

FIG. 13 is a diagram illustrating the cross-connect operation and the path-switch operation in the failure state (part 2). In FIG. 13, components the same as those illustrated in FIG. 12 are denoted by reference numerals the same as those used in FIG. 12. In FIG. 13, an operation performed when leading data is misidentified after cross-connect is illustrated.

It is assumed that dependent data set on the A side of the slot 3 is dependent on leading data output to the slot 4 instead of leading data output to the slot 3 (leading data misidentifying). In this case, the path switch 34*b* which selects leading data selects leading data supplied from the slot 2 which has better communication quality (path switch state is "1") and outputs the selected leading data to the slot 3. On the other hand, the path switch 34*b* which selects dependent data selects dependent data supplied from the slot 1 in accordance with a switch state (a path switch state is "0") of leading data of the path switch 34*c* due to the leading data misidentifying described above and outputs the selected dependent data to the slot 3. Therefore, when the leading data misidentifying of the dependent data occurs, the transmission apparatus 34 selects a direction of the slot 1, that is, a direction in which the failure has occurred, and signal relief is not performed.

Figure 14:
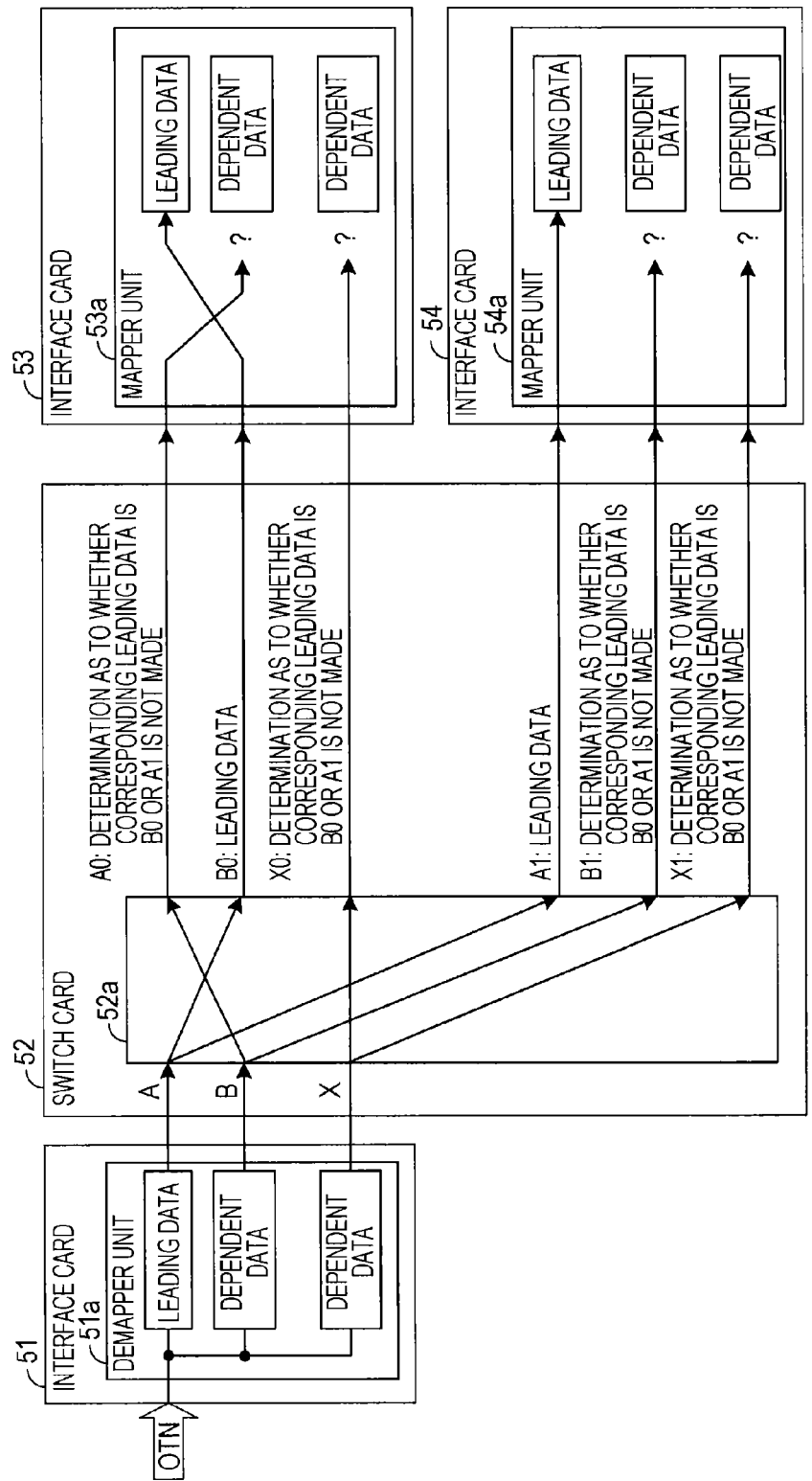
FIG. 14 is a diagram illustrating multicast.

Next, a problem which arises when a failure has not occurred will be described. FIG. 14 is a diagram illustrating multicast. In FIG. 14, interface cards 51, 53, and 54 and a switch card 52 included in the transmission apparatus are illustrated. The interface card 51 includes a demapper unit 51*a*, and the switch card 52 includes a cross-connect 52*a*. The interface cards 53 and 54 include mapper units 53*a* and 54*a*, respectively.

The demapper unit 51*a* of the interface card 51 performs demapping on OTN data so as to obtain leading data A and dependent data B to dependent data X. The cross-connect 52*a* of the switch card 52 cross-connects the leading data A and the dependent data B to dependent data X obtained by demapping performed by the demapper unit 51*a* of the interface card 51 so as to obtain dependent data A0 and leading data B0 to leading data X0 for the interface card 53. Furthermore, the cross-connect 52*a* cross-connects the leading data A and the dependent data B to dependent data X obtained by demapping so as to obtain leading data A1 and dependent data B1 to dependent data X1 for the interface card 54.

Leading data is cross-connected along with data representing that the leading data itself is a head of data, and therefore, can be recognized as "leading data". On the other hand, dependent data is cross-connected along with information representing that the dependent data itself is dependent on the leading data A, for example. However, the dependent data is merely recognized as "the data itself is dependent on the leading data A before cross-connect", and is not recognized whether the data itself is dependent on the leading data B0 or dependent on the leading data A1 after cross-connect.

Accordingly, the interface cards 53 and 54 are not capable of recognizing correspondence between dependent data and leading data obtained after cross-connect when the leading data and the dependent data are mapped as OTN data after cross-connect, and therefore, mapping is not performed.

Figure 15:
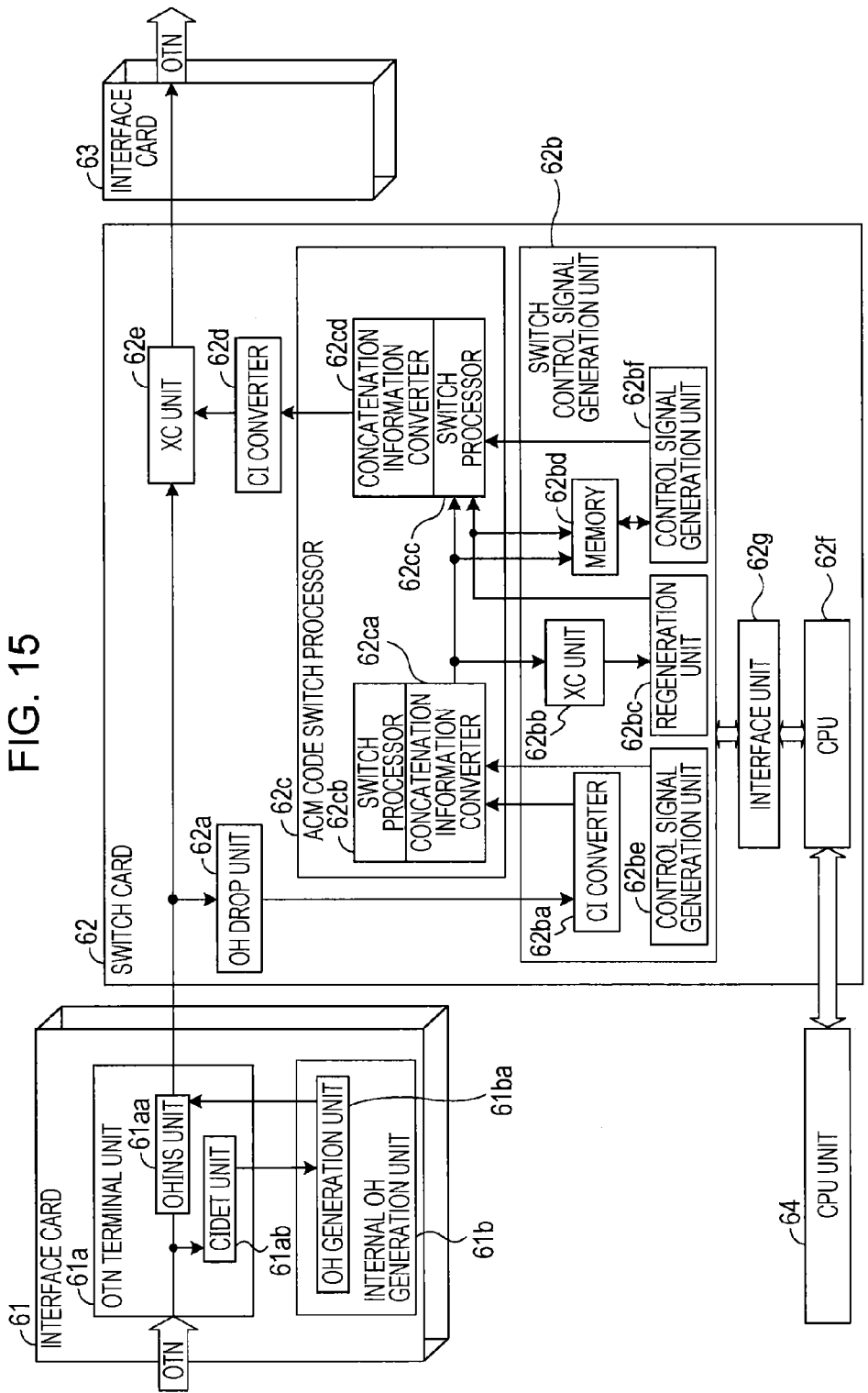
FIG. 15 is a block diagram illustrating a transmission apparatus according to a second embodiment.

Hereinafter, a transmission apparatus according to the second embodiment will be described. FIG. 15 is a block diagram illustrating a transmission apparatus according to the second embodiment. As illustrated in FIG. 15, the transmission apparatus includes interface cards 61 and 63, a switch card 62, and a CPU (Central Processing Unit) section 64. The interface cards 61 and 63 perform a packet termination process. The switch card 62 performs a cross-connect process. Furthermore, the switch card 62 performs a switch process of 1+1, 1:N, UPSR, or BLSR, for example, depending on an application to which the transmission apparatus is applied. The CPU unit 64 controls the entire transmission apparatus and performs synchronization control and monitoring control, for example. The transmission apparatus has a function of restoring pairing between leading data and dependent data after switching, a function of notifying the interface card 63 on an output side of concatenation information output from the interface card 61, and a function of processing concatenation information obtained after cross-connect.

The interface card 61 includes an OTN terminal unit 61*a* and an internal OH (Over Head) generation unit 61*b*. The OTN terminal unit 61*a* includes an OHINS (OHINSert) unit 61*aa* and a CIDET (Concatenation Information Detection) unit 61*ab*.

The switch card 62 includes an OH drop unit 62*a*, a switch control signal generation unit 62*b*, an ACM (Address Column Memory data) code switch processor 62*c*, a CI converter 62*d*, an XC unit 62*e*, a CPU 62*f*, and an interface unit 62*g*. The switch control signal generation unit 62*b* includes a CI converter 62*ba*, an XC unit 62*bb*, a regeneration unit 62*bc*, a memory 62*bd*, and control signal generation units 62*be* and 62*bf*. The ACM code switch processor 62*c* includes concatenation information converters 62*ca* and 62*cd* and switch processors 62*cb* and 62*cc*. Note that the ACM code switch processor 62*c* is equivalent of a virtual switch.

An OTN signal is input to the OTN terminal unit 61*a* of the interface card 61. The CIDET unit 61*ab* of the OTN terminal unit 61a terminates OTN concatenation information. An OH generation unit 61ba of the internal OH generation unit 61b generates an overhead suitable for a local format of the transmission apparatus. The generated overhead includes terminated concatenation information.

The OHINS unit 61aa of the OTN terminal unit 61a inserts the overhead generated by the internal OH generation unit 61b into a blank space of an OTN frame so as to generate a frame of the local format.

Note that concatenation information of a leading ts includes a flag representing that the leading ts, an interface card number of the leading ts, and an ODU size. Concatenation information of a dependent ts includes a flag representing the dependent ts, an interface card number of the leading ts, and a ts number of the leading ts.

The OH drop unit 62a of the switch card 62 extracts the concatenation information inserted by the interface card 61 and outputs the concatenation information to the switch control signal generation unit 62b. The CI converter 62b a converts the concatenation information based on the interface card 61 generated by the interface card 61 (interface-basis concatenation information) into concatenation information based on a switch state in the switch card 62 (switch-basis concatenation information). The switch-basis concatenation information obtained by the conversion is output to the ACM code switch processor 62c.

The concatenation information converter 62ca of the ACM code switch processor 62c converts the switch-basis concatenation information into application-basis concatenation information. For example, when the transmission apparatus is applied to the UPSR, concatenation information corresponding to the UPSR is obtained through the conversion. Furthermore, for example, when the transmission apparatus is applied to the BLSR, concatenation information corresponding to the BLSR is obtained through the conversion.

The switch processor 62cb performs switching in accordance with failure information and concatenation information. The switching is performed by a PSW, a DTP-SW, or an SS, for example, as described above. Specifically, the switch processor 62cb corresponds to the switches illustrated in FIGS. 4 and 5.

Concatenation information which has been converted by the concatenation information converter 62ca and which is to be subjected to cross-connect is output to the XC unit 62bb of the switch control signal generation unit 62b and concatenation information which has been converted by the concatenation information converter 62ca and which is not to be subjected to cross-connect is output to the switch processor 62cc.

The XC unit 62bb of the switch control signal generation unit 62b cross-connects the concatenation information. When the concatenation information is multicast, the regeneration unit 62bc regenerates concatenation information of a dependent ts which is used to recognize a leading ts on which the concatenation information of the dependent ts is dependent.

The memory 62bd stores the concatenation information output from the concatenation information converter 62ca and the regeneration unit 62bc. The control signal generation unit 62bf refers to the memory 62bd and performs control for matching switch states of the leading ts and the dependent ts using the switch processor 62cc. The control signal generation unit 62bf stores switch information (for example, "0" or "1" representing a PSW state as illustrated in FIGS. 11 to 13) of the leading ts in the memory 62bd when processing the leading ts. Furthermore, when processing the dependent ts, the control signal generation unit 62bf retrieves switch information of a corresponding leading ts stored in the memory 62bd and controls the switch processor 62cc so that a switch state of the dependent ts matches a switch state of the leading ts.

The control signal generation unit 62be generates a signal used for switch control performed by the switch processor 62cb. The switch processor 62cc of the ACM code switch processor 62c performs switching in accordance with the concatenation information output from the concatenation information converter 62ca or the regeneration unit 62bc and the failure information. The concatenation information converter 62cd converts switch-basis concatenation information into application-basis concatenation information. The CI converter 62d converts the switch-basis concatenation information into concatenation information based on the interface card 63.

The XC unit 62e performs cross-connect on a main signal. When performing cross-connect on a main signal, the XC unit 62e inserts the concatenation information output from the CI converter 62d into a blank overhead of the main signal. The interface card 63 converts the main signal output from the XC unit 62e into an OTN transmission frame in accordance with the concatenation information.

The CPU 62f of the switch card 62 controls the entire switch card 62 in response to an instruction issued by the CPU unit 64. The interface unit 62g relays data transmitted between the CPU 62f and the switch control signal generation unit 62b.

Hereinafter, operation of the switch card 62 will be described while processes performed by the OH drop unit 62a, the CI converter 62ba, the control signal generation unit 62be, the concatenation information converter 62ca, and the switch processor 62cb illustrated in FIG. 15 are collectively referred to as a first process, processes performed by the XC unit 62bb and the regeneration unit 62bc are collectively referred to as a second process, processes performed by the memory 62bd, the control signal generation unit 62bf, the switch processor 62cc, and the concatenation information converter 62cd are collectively referred to as a third process, and processes performed by the CI converter 62d and the XC unit 62e are collectively referred to as a fourth process.

[First Process] The OH drop unit 62a extracts concatenation information mapped by the interface card 61 and outputs the concatenation information to the switch control signal generation unit 62b. The switch control signal generation unit 62b converts the concatenation information based on the interface card 61 into switch-basis concatenation information by the CI converter 62ba. The converted concatenation information is output to the ACM code switch processor 62c and converted into application-basis concatenation information by the concatenation information converter 62ca. The switch processor 62cb performs a switch process in accordance with the concatenation information and failure information. The control signal generation unit 62be generates a control signal used to control the switch processor 62cb using a control signal supplied from the CPU 62f.

[Second Process] The XC unit 62bb cross-connects the concatenation information processed in the first process. When the cross-connected concatenation information is multicast, concatenation information which is the same as the cross-connected concatenation information exists, and accordingly, the regeneration unit 62bc regenerates concatenation information in accordance with tributary information of a transmission destination set by the CPU 62f.

[Third Process] The control signal generation unit 62bf performs matching of switch states of a leading ts and a dependent ts in the UPSR (path switches) or the BLSR (service selectors or the like). When the leading ts is to be processed, switch information of the leading ts is stored in the memory 62*bd*. When the dependent ts is to be processed, the control signal generation unit 62*bf* retrieves the switch information of the switch of the leading ts in accordance with leading ts information included in the regenerated concatenation information and controls the switch processor 62*cc* so that a state of the switch of the dependent ts matches a state of the switch of the leading ts. The switch processor 62*cc* performs a switch process in accordance with an instruction issued by the control signal generation unit 62*bf*.

[Fourth Process] The CI converter 62*d* converts concatenation information based on an internal process of the switch card 62 into concatenation information based on the interface card 63. The XC unit 62*e* inserts the concatenation information into a blank overhead of a main signal when the main signal is subjected to a cross-connect process and outputs the main signal to the interface card 63.

Figure 16:
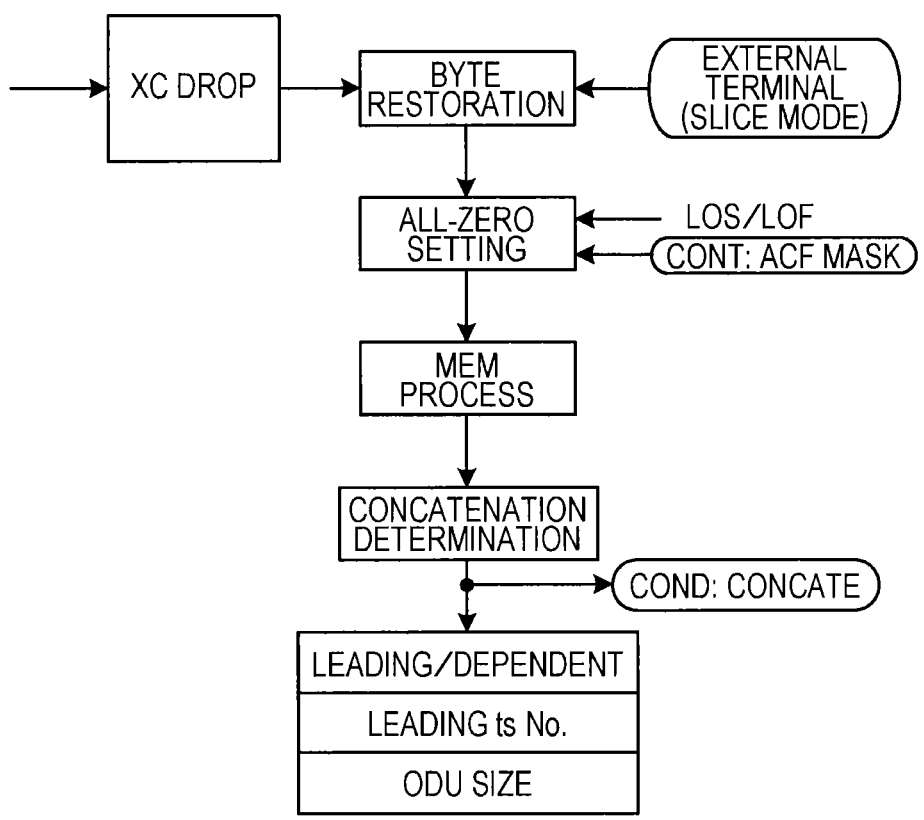
FIG. 16 is a diagram illustrating an operation of the transmission apparatus (part 1)

FIG. 16 is a diagram illustrating an operation of the transmission apparatus (part 1). "XC drop" illustrated in FIG. 16 corresponds to an operation performed by the OH drop unit 62*a* illustrated in FIG. 15. "Byte restoration", "all-zero setting", "MEM process", "concatenation determination", "leading/dependent", "leading ts No.", and "ODU size" illustrated in FIG. 16 correspond to operations of the CI converter 62*ba*.

The transmission apparatus extracts interface-basis concatenation information inserted by the interface card 61 (XC drop). The transmission apparatus restores divided signals of one bit, two bits, and four bits so as to perform a main signal process on byte information of eight bits (byte restoration). The transmission apparatus performs masking on the concatenation information in the event of failure (LOS (Loss of Signal) or LOF (Loss of Frame)) of a back board (which is provided between the interface cards 61 and 63 and the switch card 62) (all-zero setting). The all-zero setting is performed so that performance of switch control using improper concatenation information is avoided.

The transmission apparatus outputs valid data to a succeeding process block while six-step protection is performed so that error data obtained in a failure of an interface between a main signal process block and the switch control signal generation unit 62*b* is not output to the succeeding process block (MEM (memory) process).

The transmission apparatus determines whether a normal concatenation information has been obtained (concatenation determination). When the concatenation information is a normal code, the transmission apparatus converts the concatenation information based on the interface card into concatenation information based on the switch card (leading/dependent, leading ts No., and ODU size).

Figure 17:
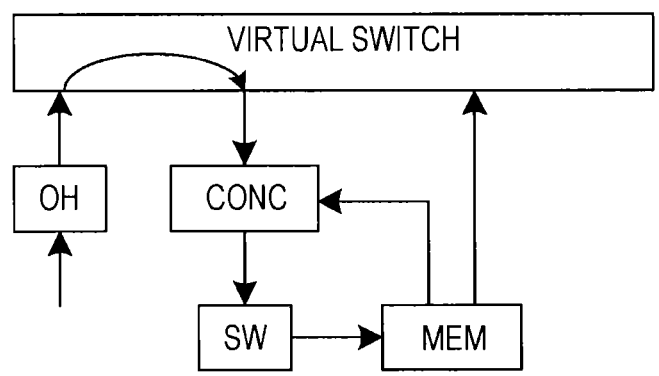
FIG. 17 is a diagram illustrating the operation of the transmission apparatus (part 2)

FIG. 17 is a diagram illustrating the operation of the transmission apparatus (part 2). In FIG. 17, "virtual switch" corresponds to an operation of the ACM code switch processor 62*c* illustrated in FIG. 15. In FIG. 17, "OH" corresponds to an operation of the OH drop unit 62*a* illustrated in FIG. 15. Furthermore, "SW" and "MEM" correspond to operations of the switch control signal generation unit 62*b* illustrated in FIG. 15. In FIG. 17, "CONC" represents concatenation information. Note that a description of an operation of "OH" is omitted since the operation has been described with reference to FIG. 16.

The virtual switch converts concatenation information output from the OH into a switch-card basis code (as denoted by an arrow mark included in the virtual switch in FIG. 17). In a switch process (a switch process of a DTP-SW, a PSW, or an SS) performed by the SW, the transmission apparatus stores a result of switch information in the MEM when a leading ts is processed. Furthermore, when a switch process is performed on a dependent ts, the transmission apparatus refers to the MEM in accordance with information on the leading ts included in concatenation information of the dependent ts and obtains the switch information of the leading ts corresponding to the dependent ts (CONC, SW, and MEM). By this, the transmission apparatus can cause a switch state of the dependent ts to match a switch state of the corresponding leading ts.

Figure 18:
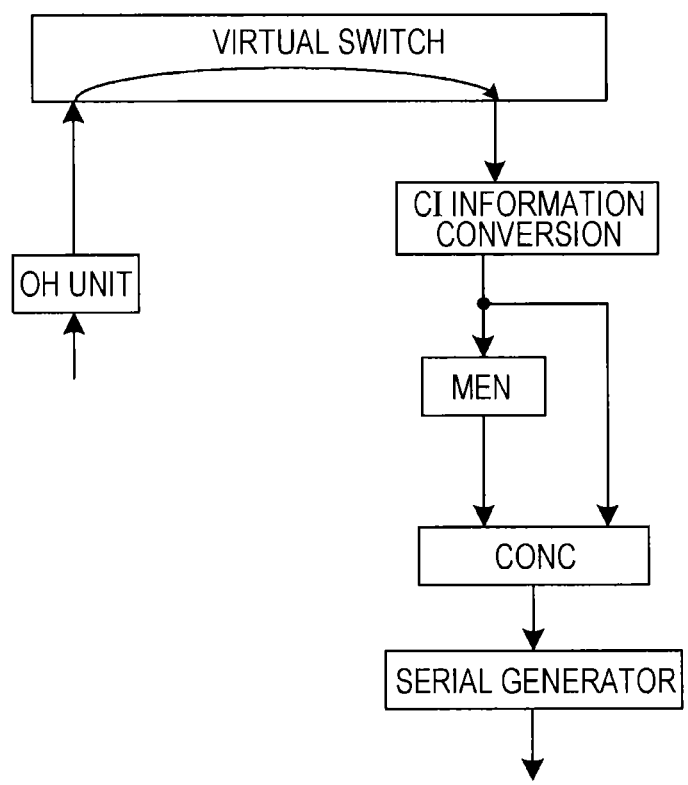
FIG. 18 is a diagram illustrating the operation of the transmission apparatus (part 3)

FIG. 18 is a diagram illustrating the operation of the transmission apparatus (part 3). In FIG. 18, "virtual switch" corresponds to an operation of the ACM code switch processor 62*c* illustrated in FIG. 15. In FIG. 18, "OH unit" corresponds to an operation of the OH drop unit 62*a* illustrated in FIG. 15. In FIG. 18, "CI information conversion", "MEM", and "serial generator" correspond to operations of the CI converter 62*d* illustrated in FIG. 15. In FIG. 18, "CONC" represents concatenation information. Note that a description of an operation of the OH unit is omitted since the operation has been described with reference to FIG. 16. Furthermore, a description of an operation of the virtual switch is omitted since the operation has been described with reference to FIG. 17.

The transmission apparatus converts the concatenation information obtained after switching into concatenation information based on the interface card 63 again (CI information conversion, MEM, and serial generator). The transmission apparatus outputs the concatenation information of the leading ts to the MEM and the serial generator. The transmission apparatus refers to the MEM in accordance with slot-line information of the leading ts and retrieves a position of the leading ts so as to generate concatenation information of the dependent ts (MEM and serial generator).

Figure 19:
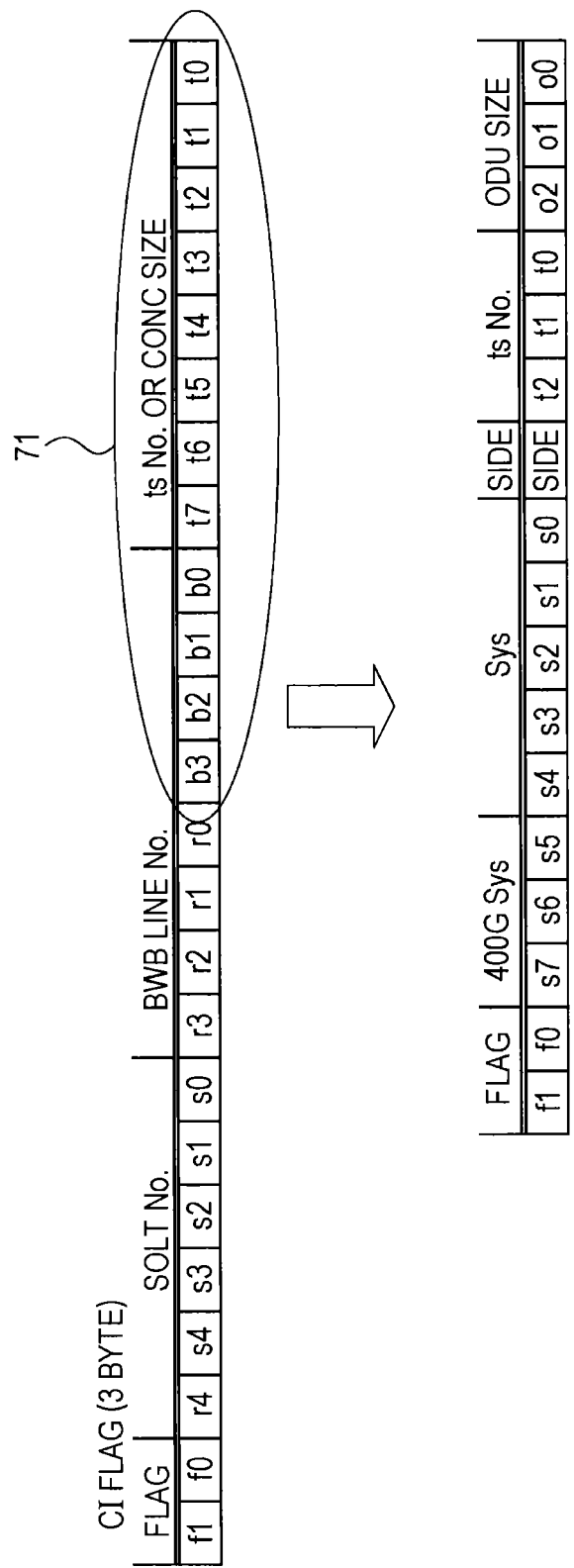
FIG. 19 is a diagram illustrating conversion of concatenation information.

Next, conversion of concatenation information will be described. FIG. 19 is a diagram illustrating conversion of concatenation information. Concatenation information illustrated on an upper side of FIG. 19 represents interface-card basis concatenation information. Concatenation information illustrated on a lower side represents switch-card basis concatenation information.

The interface-card basis concatenation information includes information on a flag representing concatenation information of a leading ts or a dependent ts. Furthermore, the interface-card basis concatenation information includes information on a leading interface card number (slot No.). Furthermore, the interface-card basis concatenation information includes information on a size of the concatenation information in a region 71 illustrated in FIG. 19 in a case of the leading ts. Furthermore, the interface-card basis concatenation information includes information on a number of the leading ts in the region 71 illustrated in FIG. 19 in a case of the dependent ts.

The CI converter 62*ba* converts the interface-card basis concatenation information into switch-card basis concatenation information (ODU2 basis or 10 G basis). An item "Side" included in the switch-card basis concatenation information represents an east side or a west side. In FIG. 19, "t0", and "t1" of an item "ts No." represent numbers of tributary slots and "t2" represents "work" or "protect". Items "400 G Sys" and "Sys" represent information for switching in the BLSR, for example.

As described above, by converting concatenation information into switch-card basis concatenation information, the concatenation information can be applied to various applications installed in the transmission apparatus. FIG. 20 is a diagram illustrating conversion of concatenation information relative to applications. In FIG. 20, applications A, B, and so on represent applications to be applied to the transmission apparatus. For example, the applications A, B, and so on represent the UPSR or the BLSR. Furthermore, "east-work (E-WK)", "east-protection (E-PT)", "west-work (W-WK)", and "west-protection (W-PT)" represent input sources of concatenation information.

It is assumed that the transmission apparatus is applied to the application A. Furthermore, it is assumed that concatenation information is input from east-work. In this case, when a switching corresponding to 1+1 or the BLSR is performed, for example, the transmission apparatus converts a portion of the switch-basis concatenation information illustrated in FIG. 19 into X11. For example, the side is reversed or "ts5 to ts8" is converted into "ts1 to ts4". By this, the transmission apparatus can be easily applied to various applications.

Figure 21:
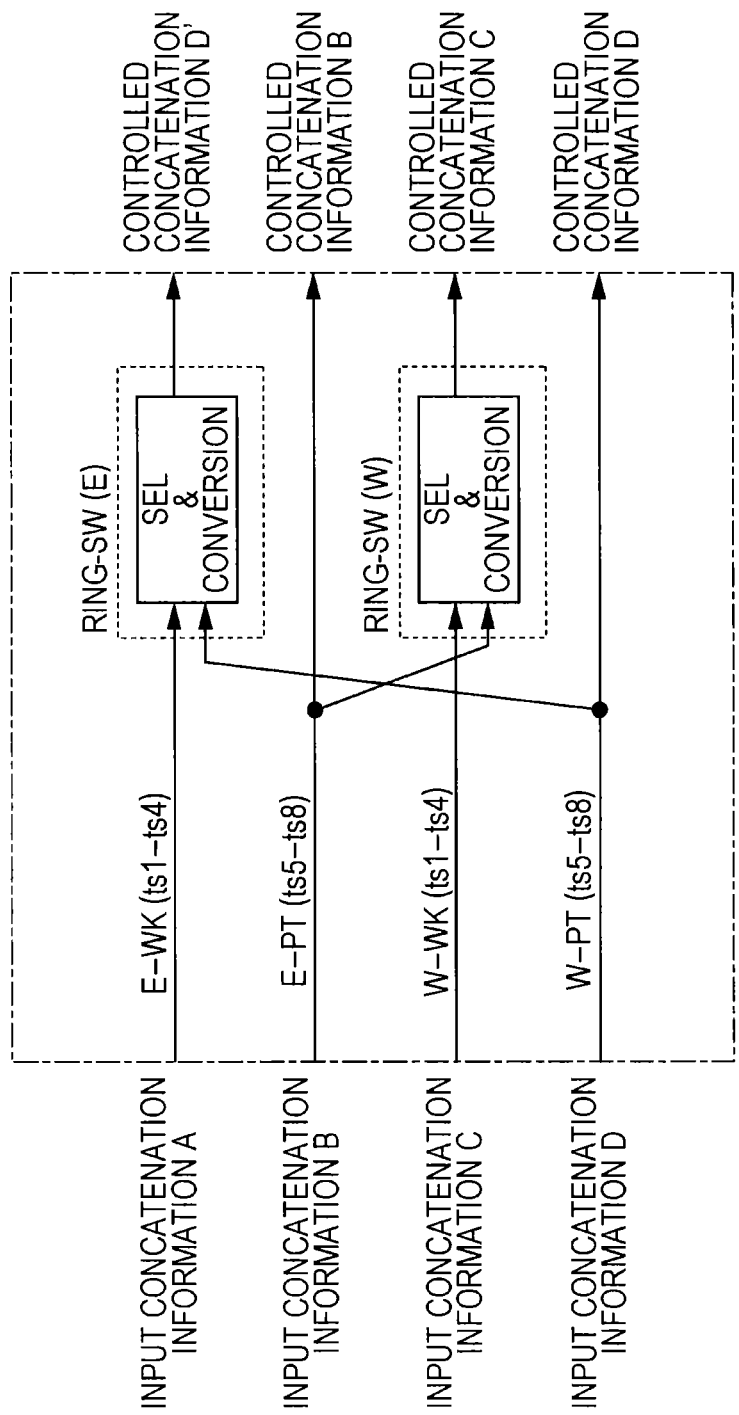
FIG. 21 is a diagram illustrating concatenation information before and after ring switches.

FIG. 21 is a diagram illustrating concatenation information before and after ring switches. In FIG. 21, an operation performed when a ring-switch (E) is turned on (W-PT is selected) is illustrated. The ring-switch (E) selects W-PT when being turned on. In this case, side information of concatenation information D which is subjected to a switch process by the ring-switch (E) is reversed from a west to an east and "ts5 to ts8" of the concatenation information D is converted into "ts1 to ts4".

By this, different concatenation information is output from the ring-switch (E). Accordingly, when a dependent ts is controlled in accordance with a leading ts on a downstream side of the transmission apparatus, the dependent ts corresponds to only one leading ts, and the dependent ts is properly controlled.

Next, matching of switch states will be described. The transmission apparatus performs the following process so that a switch state of a dependent ts matches a switch state of a leading ts. The transmission apparatus stores a switch state of a leading ts as switch-basis information mapped on concatenation information. Specifically, the transmission apparatus stores the same switch information in a PSW (A and B sides), an SS (Add and Thru), and a DTP-SW (WK and PT) when a leading ts is processed.

The transmission apparatus reads a switch state stored when the leading ts is processed from leading ts information included in concatenation information of the dependent ts and uses the switch state in switch control when the dependent ts is processed. Specifically, the transmission apparatus reads switch states of a PSW (both A and B sides), an SS (both Add and Thru), and a DTP-SW (both WK and PT) and use switch states obtained after illegal determination of the read switch states in the switch control.

Note that an order of the leading ts and the dependent ts is not prescribed, and therefore, the dependent ts may be processed first. In this case, the transmission apparatus performs the process in accordance with a leading ts in a preceding frame. Furthermore, the transmission apparatus performs the following process when concatenation information is different between work and protection. When ODU levels are different from each other, the transmission apparatus employs a larger one of the ODU levels. Furthermore, when a leading ts or a dependent ts is different between work and protection, the transmission apparatus processes the leading ts and the dependent ts as a leading ts. Note that, when ODU levels are different from each other, the transmission apparatus employs a larger one of the ODU levels.

Figure 22:
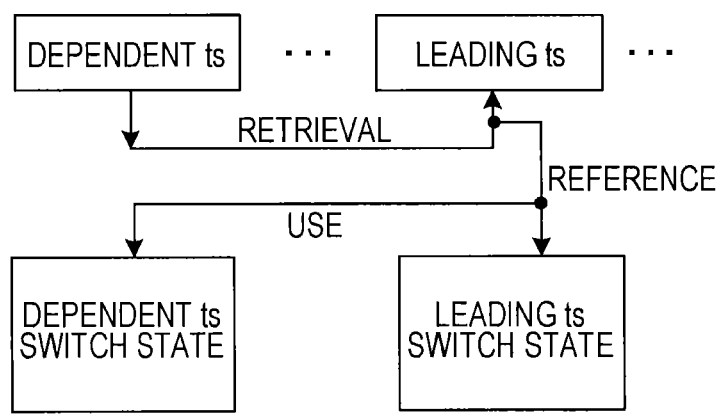
FIG. 22 is a diagram illustrating matching of switch states.

FIG. 22 is a diagram illustrating matching of switch states. As illustrated in FIG. 22, when a dependent ts is processed, the transmission apparatus refers to a switch state of a leading ts which has been added to the dependent ts and uses the switch state of the leading ts as a switch state of the dependent ts. By this, the dependent ts is subjected to a switch process with a switch state the same as that of the corresponding leading ts.

Figure 23:
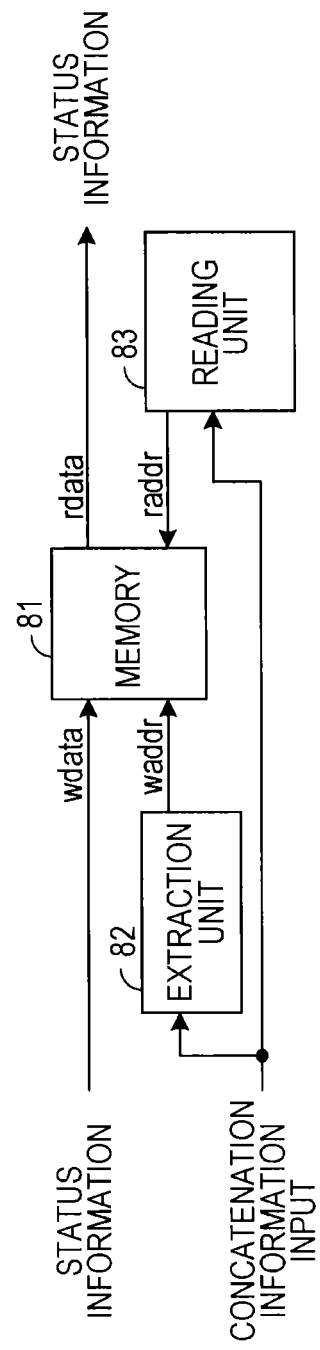
FIG. 23 is a block diagram illustrating the matching of switch states.

FIG. 23 is a block diagram illustrating the matching of switch states. A memory 81 illustrated in FIG. 23 corresponds to the memory 62*bd* illustrated in FIG. 15 and the MEM illustrated in FIG. 17, for example. An extraction unit 82 and a reading unit 83 illustrated in FIG. 23 correspond to the control signal generation unit 62*bf* illustrated in FIG. 15, for example. Status information (switch state) written in the memory 81 is output from a switch (a DTP-SW, a PSW, or an SS). The status information is output from the memory 81 to the control signal generation unit 62*bf* illustrated in FIG. 15.

It is assumed that, when a tributary slot is processed, the tributary slot is determined to be a leading ts. In this case, the extraction unit 82 extracts leading ts information of the leading ts included in concatenation information and stores status information of the switch of the leading ts in the memory 81 using the extracted leading ts information as a write address (waddr).

It is assumed that, when a tributary slot is processed, the tributary slot is determined to be a dependent ts. In this case, the reading unit 83 extracts leading ts information of a leading ts included in concatenation information of the dependent ts and generates a read address (raddr). By this, status information of the leading ts corresponding to the dependent ts is read from the memory 81.

Next, a process performed on concatenation information after cross-connect will be described. The transmission apparatus sets a switch-basis group ID in a cross-connect setting. The transmission apparatus newly generates concatenation information of a leading ts used in a process performed after cross-connect relative to concatenation information after alarm cross-connect. Furthermore, the transmission apparatus newly generates concatenation information of a dependent ts in accordance with concatenation information of a corresponding leading ts which has been retrieved by the transmission apparatus. The transmission apparatus performs a PSW process using the newly generated concatenation information and selects an A side or a B side in accordance with a result of the PSW process so as to perform virtual switch after cross-connect.

Figure 24:
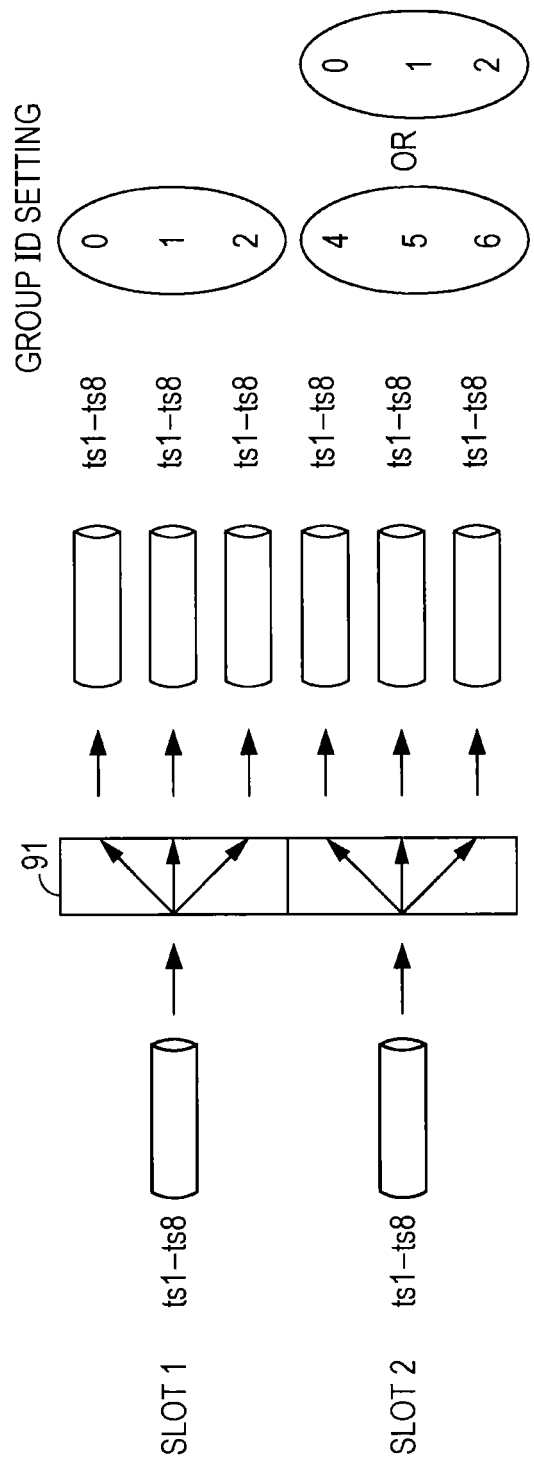
FIG. 24 is a diagram illustrating a concatenation information process after cross-connect.

FIG. 24 is a diagram illustrating a concatenation information process after cross-connect. In FIG. 24, an XC unit 91 included in the transmission apparatus is illustrated. The XC unit 91 illustrated in FIG. 24 corresponds to the XC unit 62*bb* illustrated in FIG. 15, for example. Since the relationship between a leading ts and a dependent ts can be flexibly set in the OTN standard, the relationship between a leading ts and a dependent ts is not recognized after cross-connect. Therefore, the transmission apparatus assigns group IDs to groups of ts1 to ts8 which have been multicast. For example, as illustrated in FIG. 24, group IDs 0, 1, and so on are assigned to groups of ts1 to ts 8 which have been multicast. Note that the same group IDs may be assigned to ts groups in different slots.

An output direction of concatenation information of a leading ts which is cross-connected by the XC unit 91 is determined, a number of the output destination becomes new concatenation information of the leading ts (obtained after the cross-connect). Furthermore, the concatenation information of the leading ts input to the XC unit 91 includes leading ts information before the cross-connect. Accordingly, the concatenation information of the leading ts after the cross-connect also includes the leading ts information of the original leading ts.

Concatenation information of a dependent ts after cross-connect retrieves the new concatenation information of the leading ts corresponding to the dependent ts in accordance with the leading ts information of the original leading ts in ts1 to ts8 in the same group ID. Then the cross-connected concatenation information of the dependent ts is regenerated using new leading ts information of the retrieved concatenation information of the leading ts as new leading ts information.

As described above, the transmission apparatus assigns a group ID to a cross-connected tributary slots. Then the transmission apparatus retrieves a leading ts corresponding to a dependent ts in the same group ID and regenerates new concatenation information of the dependent ts. By this, the transmission apparatus can restore the relationship between the dependent ts and the leading ts after cross-connect. Furthermore, since the transmission apparatus retrieves the leading ts corresponding to the dependent ts in the same group ID, a period of time used for the regeneration of concatenation information of the dependent ts can be reduced.

Figure 25:
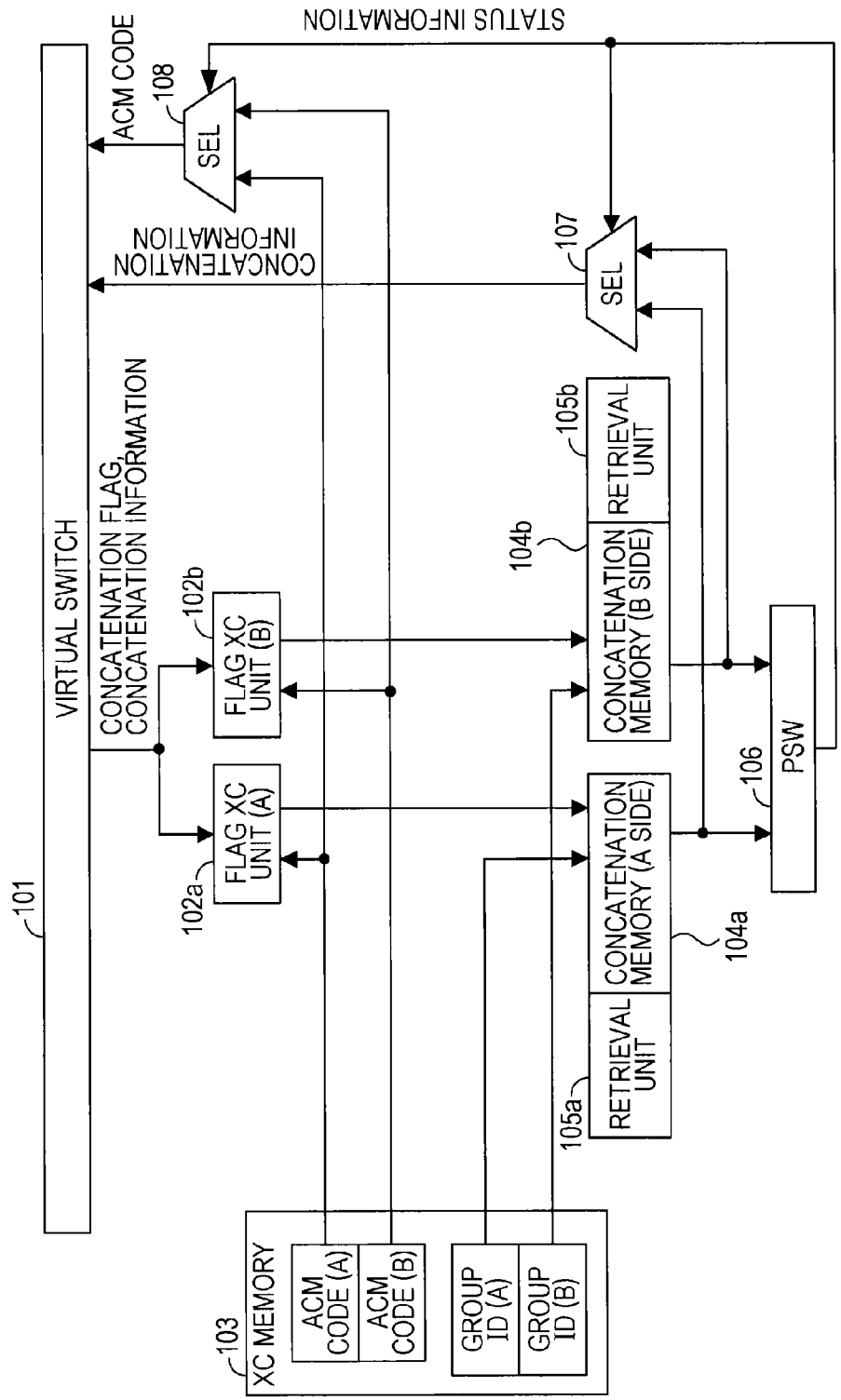
FIG. 25 is a block diagram illustrating a process of regenerating concatenation information.

FIG. 25 is a block diagram illustrating a process of regenerating concatenation information. In FIG. 25, a virtual switch 101, flag XC units 102a and 102b, an XC memory 103, concatenation memories 104a and 104b, retrieval units 105a and 105b, a PSW 106, and selectors (SELs) 107 and 108 are illustrated. The virtual switch 101 illustrated in FIG. 25 corresponds to an operation of the ACM code switch processor 62c illustrated in FIG. 15. The flag XC units 102a and 102b illustrated in FIG. 25 correspond to the XC unit 62bb illustrated in FIG. 15. The concatenation memories 104a and 104b and the retrieval units 105a and 105b illustrated in FIG. 25 correspond to the regeneration unit 62bc. In FIG. 25, "(A)" and "(B)" represent A and B sides (east and west sides), respectively.

The flag XC units 102a and 102b receive concatenation flags and concatenation information from the virtual switch 101. When receiving the concatenation flags, the flag XC units 102a and 102b cross-connect the concatenation information in accordance with an ACM code obtained after ALMXC (Alarm XC) (after the PSW) which is stored in the XC memory 103 and output the cross-connected concatenation information to the concatenation memories 104a and 104b.

The concatenation information is multicast in a unit of a group of ts1 to ts8, for example. When the concatenation information is stored in the concatenation memories 104a and 104b, a group ID stored in the XC memory 103 is assigned.

When the cross-connected concatenation information is a leading ts, an output destination of the leading ts can be recognized. Therefore, the retrieval units 105a and 105b generate new concatenation information of the leading ts having a number of the output destination. The generated concatenation information is stored in the concatenation memories 104a and 104b and output to the PSW 106.

When the cross-connected concatenation information is a dependent ts, the retrieval units 105a and 105b retrieve new concatenation information of a corresponding leading ts in accordance with leading ts information (original leading ts information) included in the cross-connected concatenation information of the dependent ts. The retrieval units 105a and 105b generates new concatenation information of the dependent ts which includes leading ts information of the retrieved new concatenation information of the leading ts. The generated concatenation information is output to the PSW 106.

The PSW 106 performs path switch in accordance with the new concatenation information. When the concatenation information of the dependent ts is output, the PSW 106 performs a path switch process in accordance with the concatenation information of the leading ts. Status information of the PSW 106 is output to the selectors 107 and 108.

The selector 107 selects the new concatenation information stored in the concatenation memory 104a on the A side or the concatenation memory 104b on the B side in accordance with the status information of the PSW 106 and outputs the new concatenation information to the virtual switch 101. The selector 108 selects an ACM code on the A side or an ACM code on the B side stored in the XC memory 103 in accordance with the status information of the PSW 106 and outputs the selected ACM code to the virtual switch 101. The virtual switch 101 performs a predetermined process in accordance with the concatenation information and the ACM code output from the selectors 107 and 108, respectively.

Figure 26:
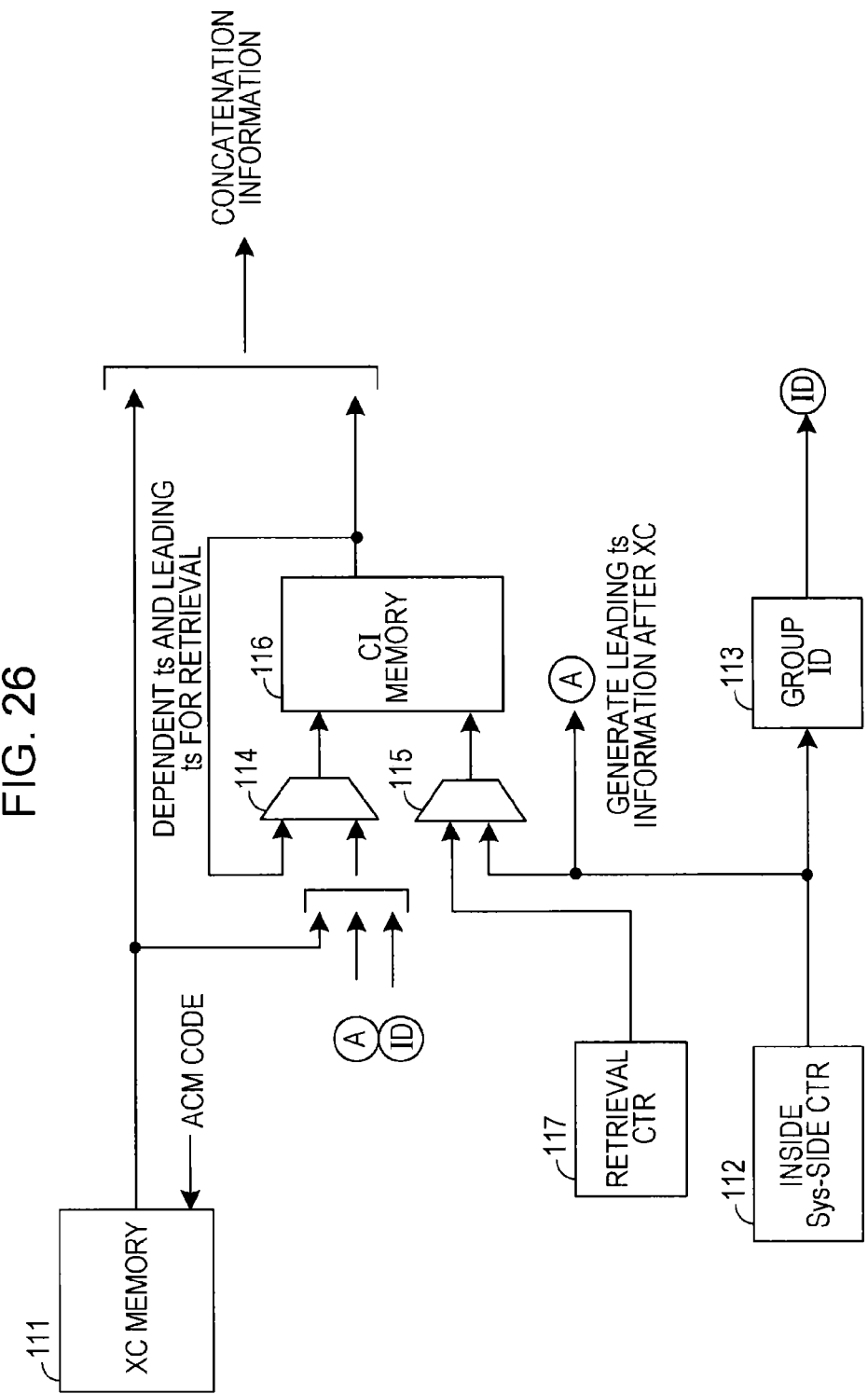
FIG. 26 is a diagram illustrating an operation of the process of regenerating concatenation information.

FIG. 26 is a diagram illustrating an operation of the process of regenerating concatenation information. An XC memory 111 illustrated in FIG. 26 corresponds to the flag XC units 102a and 102b illustrated in FIG. 25. An ACM code illustrated in FIG. 26 corresponds to the ACM codes illustrated in FIG. 25. A group ID 113 illustrated in FIG. 26 corresponds to the group IDs included in the XC memory 103 illustrated in FIG. 25. A CI memory 116 illustrated in FIG. 26 corresponds to the concatenation memories 104a and 104b illustrated in FIG. 25. An internal Sys-Side CTR (CTR: counter) 112, selectors 114 and 115, and a retrieval CTR 117 correspond to the retrieval units 105a and 105b illustrated in FIG. 25.

The XC memory 111 outputs cross-connected concatenation information. Concatenation information, leading ts information after cross-connect, and a group ID output from the XC memory 111 are input to the selector 114.

The internal Sys-Side CTR 112 generates an address used to write concatenation information of a dependent ts and a leading ts, a group ID, and leading ts information after cross-connect to the CI memory 116. Although described hereinafter, within an internal serial processing period in which the switch control signal generation unit 62b and the ACM code switch processor 62c illustrated in FIG. 15 perform a switch process, the concatenation information of the dependent ts and the leading ts, the group ID, and the leading ts information after cross-connect are written to the CI memory 116.

After the internal serial process period, concatenation information of the dependent ts is regenerated. From the retrieval CTR 117, an incremented address of the CI memory 116 is output. From the CI memory 116, concatenation information corresponding to the address is output, and is supplied to the selector 114.

When concatenation information of the dependent ts is output, the selector 114 retrieves leading ts information of the leading ts corresponding to the dependent ts in accordance with the group ID, generates new concatenation information of the dependent ts, and writes the concatenation information to the CI memory 116 again.

Figure 27:
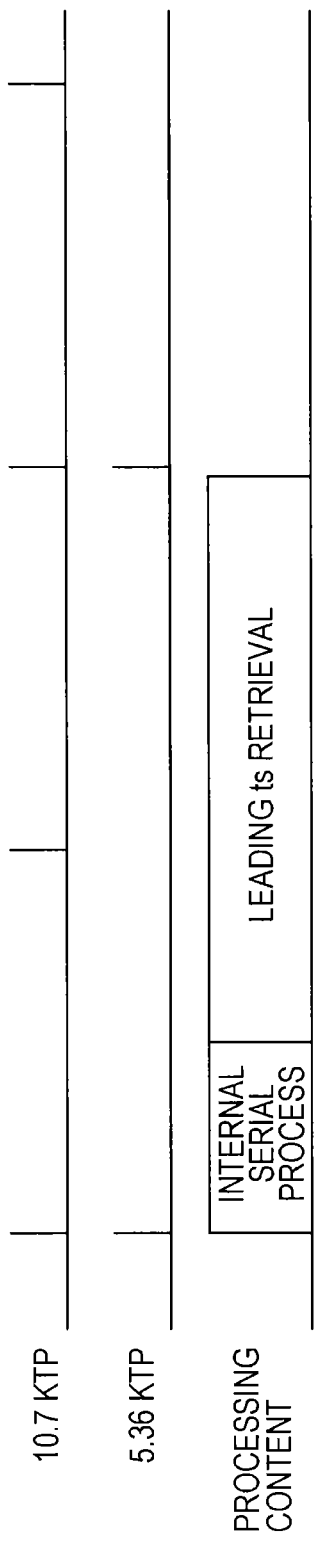
FIG. 27 is a diagram illustrating timings in the process of regenerating concatenation information.

FIG. 27 is a diagram illustrating timings in the process of regenerating concatenation information. In FIG. 27, "10.7 KTP" and "5.36 KTP" represent reference timings in the transmission apparatus. The switch control signal generation unit 62b and the ACM code switch processor 62c illustrated in FIG. 15 perform a switch process within the internal serial process period illustrated in FIG. 27. Within the internal serial process period, concatenation information of a dependent ts and a leading ts, a group ID, and leading ts information after cross-connect are written in the CI memory 116 illustrated in FIG. 26. Then, in a leading ts retrieval period illustrated in FIG. 27, the leading ts corresponding to the dependent ts is retrieved and concatenation information of the dependent ts is regenerated.

Note that approximately 3 ms is used for retrieval of all tributary slots (1920 tributary slots). By performing the process described above as 32 processes in parallel, approximately 3 ms is reduced to as small as approximately 1 ms.

Figure 28:
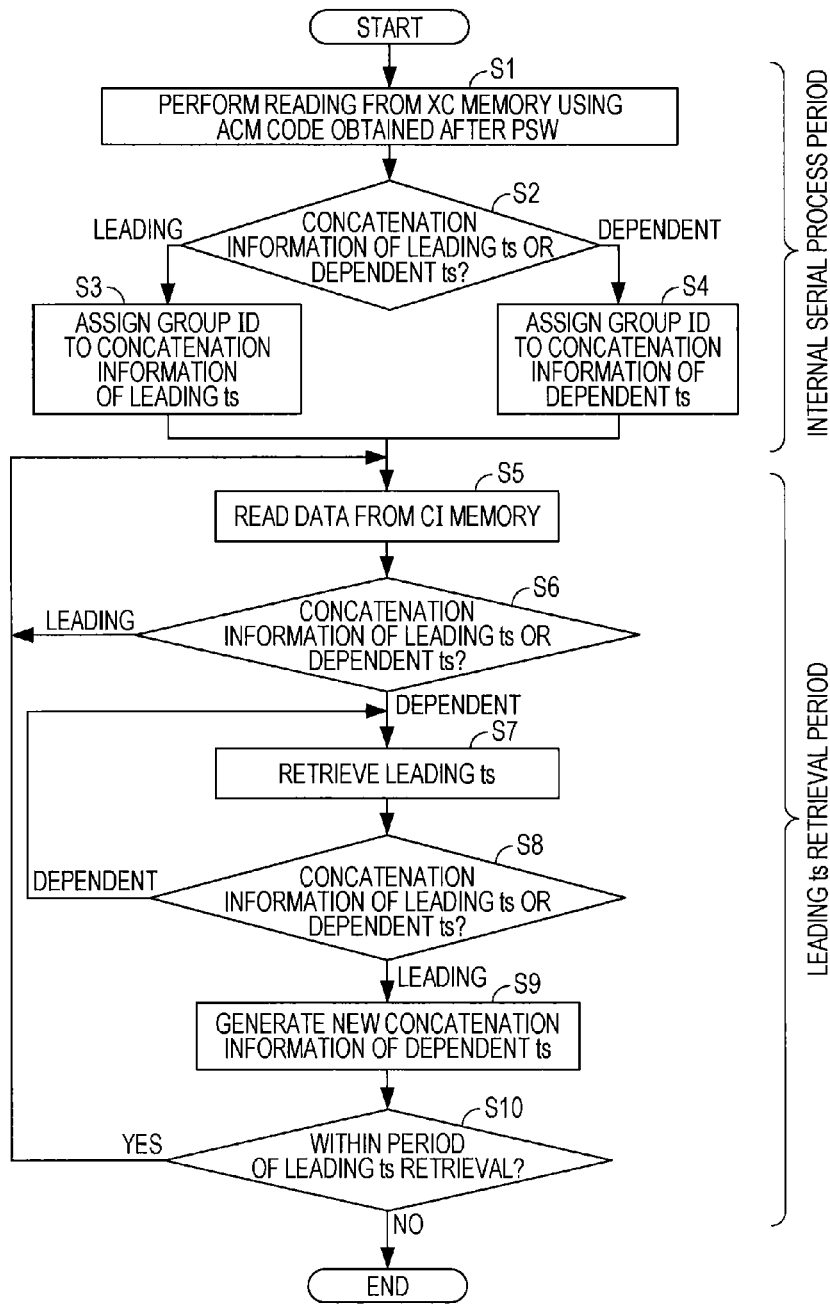
FIG. 28 is a flowchart illustrating the process of regenerating concatenation information.

FIG. 28 is a flowchart illustrating the process of regenerating concatenation information. The transmission apparatus reads concatenation information from the XC memory 111 using an ACM code obtained after the PSW (operation S1). The transmission apparatus determines whether the read concatenation information is concatenation information of a leading ts or concatenation information of a dependent ts (operation S2). In the case of the concatenation information of the leading ts, the transmission apparatus proceeds to operation S3. In the case of the concatenation information of the dependent ts, the transmission apparatus proceeds to operation S4.

The transmission apparatus assigns a group ID to new concatenation information of the leading ts including original leading ts information (leading ts information obtained before cross-connect) (Operation S3). The transmission apparatus stores the new concatenation information of the leading ts having the group ID assigned thereto in the CI memory 116.

The transmission apparatus assigns a group ID to the concatenation information of the dependent ts (operation S4). The transmission apparatus stores the concatenation information having the group ID assigned thereto in the CI memory 116. Note that the process from operation S1 to operation S4 is performed in the internal serial process period.

The transmission apparatus reads data (concatenation information) from the CI memory 116 (Operation S5). The transmission apparatus determines whether the read concatenation information is concatenation information of a leading ts or concatenation information of a dependent ts (Operation S6). When the read concatenation information is the concatenation information of the leading ts, the transmission apparatus proceeds to Operation S5. When the read concatenation information is the concatenation information of the dependent ts, the transmission apparatus proceeds to Operation S7.

The transmission apparatus retrieves new concatenation information of the corresponding leading ts in accordance with the group ID and original leading ts information included in the read concatenation information (Operation S7). The transmission apparatus determines whether the retrieved concatenation information is concatenation information of a leading ts or concatenation information of a dependent ts (Operation S8). When the retrieved concatenation information is the concatenation information of the dependent ts, the transmission apparatus proceeds to Operation S7. When the retrieved concatenation information is the concatenation information of the leading ts, the transmission apparatus proceeds to Operation S9.

The transmission apparatus generates new concatenation information of the dependent ts in accordance with the new concatenation information of the leading ts (Operation S9). Specifically, the transmission apparatus generates concatenation information of the dependent ts which is dependent on the new concatenation information of the leading ts (and which has new leading ts information of the leading ts).

The transmission apparatus determines whether the leading ts retrieval period has been entered (Operation S10). When the leading ts retrieval period has been entered, the transmission apparatus proceeds to Operation S5. Otherwise, the transmission apparatus terminates the process.

Note that the process of Operation S5 to Operation S10 is performed in the leading ts retrieval period. Furthermore, the transmission apparatus repeatedly performs the process illustrated in FIG. 28.

Figure 29:
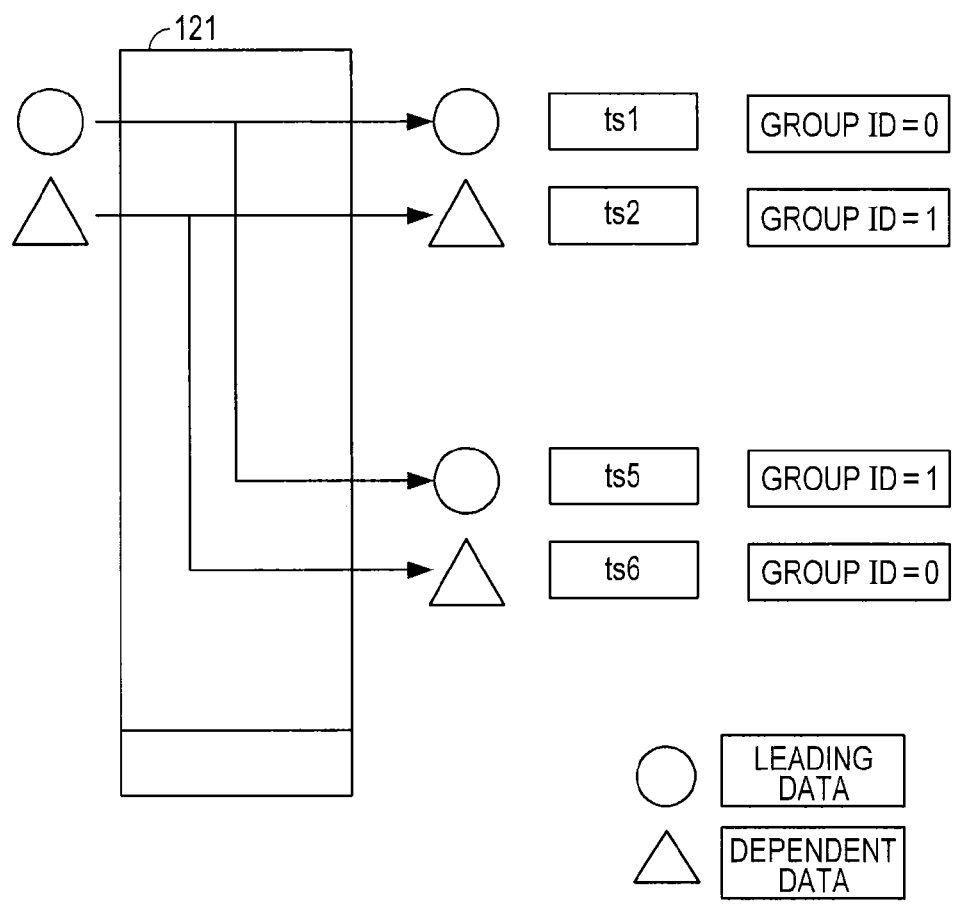
FIG. 29 is a diagram illustrating a multicast operation.

FIG. 29 is a diagram illustrating a multicast operation. In FIG. 29, an XC unit 121 included in the transmission apparatus is illustrated. As illustrated in FIG. 29, the XC unit 121 multicasts a leading ts and a dependent ts. The XC unit 121 divides the input leading ts and the input dependent ts into two groups, one of the groups including ts1 and ts6 and the other including ts2 and ts5. Furthermore, in FIG. 29, a group ID 0 is assigned to ts1 and ts6 and a group ID 1 is assigned to ts2 and ts5.

In FIG. 29, the dependent ts6 having the group ID 0 retrieves a leading ts having the same ID, for example. Accordingly, ts1 is retrieved as the leading ts for the dependent ts6. By this, concatenation information of an appropriate dependent ts which is dependent on a leading ts obtained after cross-connect is newly generated.

As described above, the transmission apparatus converts concatenation information into switch-basis concatenation information so as to perform application-basis conversion. By this, the same concatenation information is not generated and a dependent ts can be dependent on an appropriate leading ts.

Furthermore, the transmission apparatus stores a switch state of a leading ts in a memory and a corresponding switch state of a dependent ts is read from the memory. Accordingly, the transmission apparatus can perform matching of the states of the switches of the leading ts and the dependent ts.

Furthermore, the transmission apparatus assigns a group ID to a cross-connected ts. Then the transmission apparatus retrieves a leading ts corresponding to a dependent ts in the same group ID and regenerates new concatenation information of the dependent ts. By this, the transmission apparatus can restore the relationship between the dependent ts and the leading ts after cross-connect.

Note that, although the case of multicast is described in the foregoing description, the same is true to a case of broadcast.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a cross-connect unit configured to multicast or broadcast concatenation information;
   an assigning unit configured to assign a group number to a group of concatenation information of leading data and concatenation information of dependent data which are multicast or broadcast by the cross-connect unit;
   a retrieval unit configured to retrieve the concatenation information of the leading data corresponding to the dependent data, the leading data and the dependent data having the same group number assigned by the assigning unit;
   a regeneration unit configured to regenerate concatenation information of the dependent data in accordance with the concatenation information of the leading data retrieved by the retrieval unit;

a storage unit configured to store switch information of the leading data, the switch information representing a switch which switches output destinations of the leading data and the dependent data;

an information retrieval unit configured to refer to the storage unit in accordance with leading data information included in the concatenation information of the dependent data regenerated by the regeneration unit so as to retrieve switch information of the dependent data corresponding to the concatenation information regenerated by the regeneration unit; and a switching unit configured to switch the output destination of the dependent data in accordance with the switch information retrieved by the information retrieval unit, wherein at least one of the leading data and the dependent data are included in an optical signal, wherein the retrieved switch information of the dependent data is not same as the concatenation information regenerated by the regeneration unit.

2. The transmission apparatus according to claim 1, further comprising:

a converter configured to convert concatenation information cross-connected by the cross-connect unit into concatenation information based on a state of the switch.

3. The transmission apparatus according to claim 2, wherein the converter converts the concatenation information cross-connected by the cross-connect unit in accordance with an application to which the transmission apparatus is applied in an optical network.

4. The transmission apparatus according to claim 2, wherein the converter converts the concatenation information cross-connected by the cross-connect unit into concatenation information based on the switch, when an operation of the switch corresponding to 1+1 or a BLSR is performed.

5. The transmission apparatus according to claim 1, wherein the switch is a path switch, a DTP (Dual Transmit on Protection) switch, or a service selector.

6. A switching method employed in a transmission apparatus, the switching method comprising:

assigning a group number to a group of concatenation information of leading data and concatenation information of dependent data which are multicast or broadcast;

retrieving the concatenation information of the leading data corresponding to the dependent data, the leading data and the dependent data having the same assigned group number;

regenerating concatenation information of the dependent data in accordance with the retrieved concatenation information of the leading data;

storing switch information of the leading data in a storage unit, the switch information representing a switch which switches output destinations of the leading data and the dependent data;

referring to the storage unit in accordance with leading data information included in the regenerated concatenation information of the dependent data so as to retrieve switch information of the dependent data corresponding to the regenerated concatenation information; and switching the output destination of the dependent data in accordance with the retrieved switch information, wherein the retrieved switch information of the dependent data is not same as the regenerated concatenation information.

7. A transmission apparatus comprising:

an assigning unit assigning a group number to concatenation information of a leading data and concatenation information of a dependent data which are multicast or broadcast, the dependent data is dependent on the leading data;

a retrieval unit retrieving the concatenation information of the leading data corresponding to the dependent data, the leading data and the dependent data having the same group number;

a regeneration unit regenerating concatenation information of the dependent data in accordance with the concatenation information of the leading data, the regenerated concatenation information of the dependent data comprising a new output destination of the leading data;

a storage unit storing switch information of the leading data, the switch information representing a switch which switches output destinations of the leading data and the dependent data;

an information retrieval unit, in accordance with leading data information included in the regenerated concatenation information of the dependent data, retrieving switch information of the dependent data corresponding to the regenerated concatenation information; and a switching unit switching the output destination of the dependent data in accordance with the retrieved switch information to restore pairing of the dependent data and the leading data, wherein the retrieved switch information of the dependent data is not same as the concatenation information regenerated by the regeneration unit.

* * * * *